United States Patent
Rimer et al.

(10) Patent No.: US 9,714,174 B2
(45) Date of Patent: Jul. 25, 2017

(54) METHODS OF CONTROLLING POLYMORPHISM IN ORGANIC-FREE SYNTHESIS OF NA-ZEOLITES AND ZEOLITE CRYSTALS FORMED THEREFROM

(71) Applicants: Jeffrey D. Rimer, Seven Fields, PA (US); Miguel Maldonado, Cypress, TX (US); Matthew D. Oleksiak, Houston, TX (US)

(72) Inventors: Jeffrey D. Rimer, Seven Fields, PA (US); Miguel Maldonado, Cypress, TX (US); Matthew D. Oleksiak, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 855 days.

(21) Appl. No.: 13/946,919

(22) Filed: Jul. 19, 2013

(65) Prior Publication Data
US 2014/0050659 A1     Feb. 20, 2014

Related U.S. Application Data

(60) Provisional application No. 61/673,498, filed on Jul. 19, 2012.

(51) Int. Cl.
C01B 39/02     (2006.01)
C01B 39/46     (2006.01)
(Continued)

(52) U.S. Cl.
CPC ............. *C01B 39/02* (2013.01); *C01B 39/46* (2013.01); *C01B 39/50* (2013.01); *C01B 39/52* (2013.01);
(Continued)

(58) Field of Classification Search
CPC ......... C01B 39/02; C01B 39/50; C01B 38/02; C01B 38/46; C01B 38/50; C01B 38/52
See application file for complete search history.

(56) References Cited

U.S. PATENT DOCUMENTS

| 4,717,560 | A | 1/1988 | Vaughan |
| 2011/0009256 | A1* | 1/2011 | Tsapatsis ............... B01D 53/02 502/62 |

FOREIGN PATENT DOCUMENTS

KR     200000073874     12/2000

OTHER PUBLICATIONS

ANA, la#d, Framework Type Data, International Zeolite Association, pp. 46-47,downloaded from http://europe.iza-structure.org/IZA-SC/Atlas_pdf/ANA.pdf (Nov. 2016).*
(Continued)

*Primary Examiner* — David M Brunsman
(74) *Attorney, Agent, or Firm* — Patterson + Sheridan, LLP

(57) ABSTRACT

Methods of controlling crystal polymorphism in organic-free synthesis of Na-Zeolites and the zeolite crystals formed using those methods are provided. The methods disclosed herein create certain types of zeolite crystals more efficiently than other previously known methods. The methods also create certain types of zeolite crystals in a form and concentration not previously disclosed. The methods disclosed herein generally comprise using solutions with varying ratios of silicon (Si), aluminum (Al), hydroxide (OH), and water. Some implementations of the invention disclosed include efficient methods of producing nearly pure cancrinite (CAN), methods of obtaining sodalite in solutions with a high Si/Al ratio, and a method of forming thin, platelet-like ANA crystals with a width of less than about 1 μm and a length of at least about 3 μm.

10 Claims, 42 Drawing Sheets

(51) Int. Cl.
  C01B 39/50 (2006.01)
  C01B 39/52 (2006.01)
(52) U.S. Cl.
  CPC ...... C01P 2004/20 (2013.01); C01P 2004/54 (2013.01)

(56) References Cited

OTHER PUBLICATIONS

Dwyer et al, ZSM-4 Crystallization via Faujasite Metamorphosis, Mobil Research and Development Corporation, Research Department, Paulsbora, NJ. Journal of Catalysis 59, 1979, pp. 263-271.
Cichocki, Crystallization Field of Zeolite T at 100?C for a SiO2/Al2O3 Ratio of 28 and Crystallization Sequences in the Na2O—K2O—SiO2—Al2O3—H2O System, J. Chem. Soc., Faraday Trans. 1, 1985, 81, pp. 1297-1302.
Shiralkar et al, Synthesis of the Molecular Sieve ZSM-5 without the Aid of Templates, Dept. of Chemistry, Texas A&M, College Station, Texas. Zeolites, 1989, vol. 9, September, pp. 363-370.
Zones, Conversion of Faujasites to High-silica Chabazite SSZ-13 in the Presence of N,N,N-Trimethyl-1-adamantammonium Iodide, J. Chem. Soc. Faraday Trans., 1991, 87(22), pp. 3709-3716.
Zones et al, Boron-beta Zeolite Hydrothermal Conversions: The Influence of Template Structure and of Boron Concentration and Source, Microporous Materials 2 (1994), pp. 543-555.
Narayanan et al, Synthesis of ZSM-5 Type Zeolites with and without Template and Evaluation of Physicochemical Properties and Aniline Alkylation Activity, Catalysis Letters 34 (1995), pp. 129-138.
Bieniok et al, Synthesis and Crystal Structure of Zeolite W, Resembling the Mineral Merlinoite, J. Mater. Chem., 1996, 6(2), pp. 271-275.
Latham et al, The Synthesis of Iron Cancrinite Using Tetahedral Iron Species, School of Applied Sciences, University of Wolverhampton, Zeolites 17, 1996, pp. 513-516.
Albert et al, Investigations on P Zeolites: Synthesis, Characterisation, and Structure of Highly Crystalline Low-Silica NaP, Microporous and Mesoporous Materials 21 (1998), pp. 133-142.
Machado et al, Template-free Synthesis and Catalytic Behaviour of Aluminum-rich MFI-type Zeolites, Applied Catalysis A: General 181 (1999), pp. 29-38.
Brar et al, Control of Crystal Size and Distribution of Zeolite A, Ind. Eng. Chem. Res. 2001, 40 (4), pp. 1133-1139.
Megelski et al, Tuning the Size and Shape of Zeolite L-based Inorganic-Organic Host-Guest Composites for Optical Antenna Systems, Adv. Funct. Matter. 2001, 11, No. 4, August, pp. 277-286.
Skofteland et al, Potassium Merlinoite: Crystallization, Structural and Thermal Properties, Microporous and Mesoporous Materials 43 (2001), pp. 61-71.
Rakoczy et al, Template-Free Synthesis of Zeolite Ferrierite and Characterization of its Acid Sites, Chem. Eng. Technol. 25 (2002) 3, pp. 273-275.
Bhat et al, High Temperature Hydrothermal Cystallization, Morphology and Yield Control of Zeolite Type K-LTL, Microporous and Mesoporous Materials 76 (2004), pp. 81-89.
Cui et al, Preparation and Gas Separation Performance of Zeolite T Membrane, J. Mater. Chem., 2004, 14, pp. 924-932.
Larlus, Crystal Morphology Control of LTL-Type Zeolite Crystals, Chem. Mater. 2004, 16, pp. 3381-3389.
Valtchev et al, Synthesis of Zeolite Nanocrystals at Room Temperature, Langmuir 2005, 21, pp. 10724-10729.
Jon et al, Hydrothermal Conversion of FAU into BEA Zeolites, Microporous and Mesoporous Materials 96 (2006), pp. 72-78.
Song et al, Organic Template Free Synthesis of Aluminosilicate Zeolite ECR-1, Chem. Mater., vol. 18, No. 12, 2006, pp. 2775-2777.
Alfaro et al, Aging Time Effect on the Synthesis of Small Crystal LTA Zeolites in the Absence of Organic Template, Materials Letters 61 (2007), pp. 4655-4658.
Kazuko et al, Effect of Anion Species from Ca-sources on Framework Type of Na—Ca Zeolites Prepared at 80° C., J Porous Mater (2007) 14, pp. 401-407.
Khajavi et al, Synthesis of Thin Defect-free Hydroxy Sodalite Membranes: New Candidate for Activated Water Permeation, Journal of Membrane Science 299 (2007), pp. 63-72.
Ban et al, Synthesis of Zeolite L Crystals with Different Shapes, J Porous Mater (2007),14 pp. 119-126.
Tatlier et al, Microwave vs. Conventional Synthesis of Analcime from Clear Solutions, Journal of Crystal Growth 306 (2007), pp. 146-151.
Fan et al, Synthesis of Nanometer-Sized Sodalite Without Adding Organic Additives, Langmuir 2008, pp. 6952-6958.
Itakura et al, Synthesis of High-silica CHA Zeolite from FAU Zeolite in the Presence of Benzyltrimethylammonium Hydroxide, Chemistry Letters vol. 37, No. 9 (2008), pp. 908-909.
Jon et al, Hydrothermal Conversion of FAU Zeolite into RUT Zeolite in TMAOH System, Microporous and Mesoporous Materials 113 (2008), pp. 56-63.
Cheng et al, Synthesis Research of Nanosized ZSM-5 Zeolites in the Absence of Organic Template, Journal of Materials Processing Technology 206 (2008), pp. 445-452.
Xie et al, Organotemplate-Free and Fast Route for Synthesizing Beta Zeolite, Chem. Mater., vol. 20, No. 14, 2008, pp. 4533-4535.
Matin et al, Applying the Taguchi Method to Develop an Optimized Synthesis Procedure for Nanocrystals of T-Type Zeolite, Chem. Eng. Technol. 2009, 32, No. 7, pp. 1042-1048.
Navrotsky et al, Thermochemistry of Microporous and Mesoporous Materials, Chemical Reviews, 2009, vol. 109, No. 9, pp. 3886-3902.
Sasaki et al, Hydrothermal Conversion of FAU Zeolite into Aluminous MTN Zeolite, J Porous Mater (2009) 16, pp. 465-471.
Inoue et al, Synthesis of LEV Zeolite by Interzeolite Conversion Method and Its Catalytic Peformance in Ethanol to Olefins Reaction, Microporous and Mesoporous Materials 122 (2009), pp. 149-154.
Iwama et al, Location of Alkali Ions and their Relevance to Crystallization of Low Silica X Zeolite, Crystal Growth and Design, vol. 10, No. 8, 2010, pp. 3471-3479.
Itakura et al, Synthesis of High-silica Offretite by the Interzeolite Conversion Method, Materials Research Bulletin 45 (2010), pp. 646-650.
Buhl et al, Nanocrystalline Sodalite Grown from Superalkaline NaCl Bearing Gels at Low Temperature (333 K) and the Influence of TEA on Crystallization Process, Microporous and Mesoporous Materials 142 (2011), pp. 666-671.
Mirfendereski et al, Investigation of Hydrothermal Synthesis Parameters on Characteristics of T Type Zeolite Crystal Structure, Powder Technology 206 (2011), pp. 345-352.
Zhang et al, Crystallization and Morphology of Mordenite Zeolite Influenced by Various Parameters in Organic-free Synthesis, Materials Research Bulletin 46 (2011), pp. 894-900.
Ji et al, Hollow Sodalite Spheres Synthesized in a First-closed Then-open System from the Synthesis Gels Aged under Ultrahigh Pressures, Microporous and Mesoporous Materials 143 (2011), pp. 189-195.
Ng et al, Capturing Ultrasmall EMT Zeolite from Template-free Systems, Science, vol. 335, 70 (2012), pp. 70-73.
Chen, Xueying, et al., "Self-Construction of Core-Shell and Hollow Zeolite Analcime Icositetrahedra: A Reversed Crystal Growth Process via Oriented Aggregation of Nanocrystallites and Recrystallization from Surface to Core", J. Am. Chem. Soc., 2007, vol. 129, pp. 13305-13312.
Gilbert, J. E. et al., "Preparation of impurity-free zeolites from coal-mine schists", European Journal of Solid State and Inorganic Chemistry, 1998, vol. 35, No. 6, pp. 447-458.
Shao, Hua et al., "Synthesis and properties of nanoparticle forms saponite claym cancrinite zeolite and phase mixtures thereof". Microporous and Mesoporous Materials, 2010, vol. 133, pp. 10-17.
International Search Report and Written Opinion Dated Oct. 25, 2013 for International Application No. PCT/US2013/051376.

(56) References Cited

OTHER PUBLICATIONS

Zhou et al, Synthesis of Zeolite T by Microwave and Conventional Heating, Microporous and Mesoporous Materials, 124 (2009), pp. 117-122.

* cited by examiner

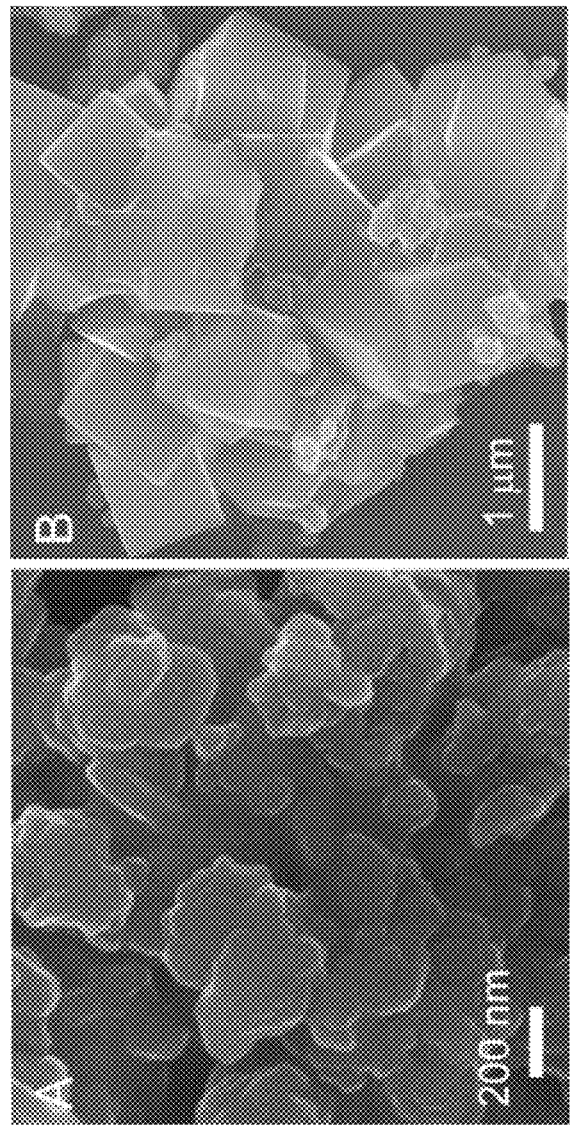

Table I. Crystal structure information of zeolite frameworks.

| Zeolite | Cell Parameters (nm) | | | Pore n-MR | Volume cm$^3$/mol |
| --- | --- | --- | --- | --- | --- |
| | a | b | c | | |
| EMT | 1.7215 | 1.7215 | 2.8082 | 12, 6, 4 | 45.3 |
| FAU | 2.4345 | 2.4345 | 2.4345 | 12, 6, 4 | 45.3 |
| LTA | 1.1919 | 1.1919 | 1.1919 | 8, 6, 4 | 42.4 |
| GIS | 0.9801 | 0.9801 | 1.0158 | 8, 4 | 36.7 |
| SOD | 0.8956 | 0.8956 | 0.8956 | 6, 4 | 36.1 |
| CAN | 1.2494 | 1.2494 | 0.5254 | 12, 6, 4 | 35.6 |
| ANA | 1.3567 | 1.3567 | 1.3567 | 8, 6, 4 | 31.4 |

FIG. 23

Table II. Zeolite framework structures prepared by organic free syntheses.

| Framework | Cell Parameters (nm) [i] | | | Rings | Building Unit(s) | Molar Volume (cm$^3$/mol) |
| --- | --- | --- | --- | --- | --- | --- |
| | a | B | c | | | |
| EMT | 1.7215 | 1.7215 | 2.8082 | 12, 6, 4 | d6R, SOD | 45.3 |
| FAU | 2.4345 | 2.4345 | 2.4345 | 12, 6, 4 | d6R, SOD | 45.3 |
| LTA | 1.1919 | 1.1919 | 1.1919 | 8, 6, 4 | d4R, SOD, LTA | 42.4 |
| GIS | 0.9801 | 0.9801 | 1.0158 | 8, 4 | GIS, DCC | 36.7 |
| SOD | 0.8956 | 0.8956 | 0.8956 | 6, 4 | SOD | 36.1 |
| CAN | 1.2494 | 1.2494 | 0.5254 | 12, 6, 4 | CAN, DZC | 35.6 |
| ANA | 1.3567 | 1.3567 | 1.3567 | 8, 6, 4 | ----- | 31.4 |

(i) Data were obtained from the International Zeolite Association Online Structure Database

FIG. 24

Table III. Syntheses using a molar ratio of 6 NaOH:190 H2O with 7 days heating at 65 °C.

| Molar Composition | | | | Si/Al Ratio [a] | Crystal Phase(s) [b] | Solution pH [c] |
| --- | --- | --- | --- | --- | --- | --- |
| SiO$_2$ | Al$_2$O$_3$ | NaOH | H$_2$O | | | |
| 4.0 | 3.0 | 6 | 190 | 0.7 | LTA | 14.2 |
| 4.0 | 2.25 | 6 | 190 | 0.9 | LTA | 14.4 |
| 4.0 | 0.5 | 6 | 190 | 4.0 | FAU | 14.3 |
| 4.0 | 1.7 | 6 | 190 | 1.2 | LTA*, FAU | 13.7 |
| 4.0 | 1.0 | 6 | 190 | 2.0 | FAU*, LTA | 14.0 |
| 3.0 | 1.0 | 6 | 190 | 1.5 | FAU, LTA | 13.9 |
| 2.0 | 1.0 | 6 | 190 | 1.0 | LTA*, FAU | 13.9 |
| 1.45 | 1.45 | 6 | 190 | 0.5 | LTA | 13.6 |
| 2.1 | 0.7 | 6 | 190 | 1.5 | LTA, FAU | 13.8 |
| 2.5 | 0.33 | 6 | 190 | 3.9 | FAU | 13.7 |
| 0.55 | 0.55 | 6 | 190 | 0.5 | LTA | 13.9 |
| 0.8 | 0.15 | 6 | 190 | 2.6 | FAU | 13.9 |
| 0.3 | 0.15 | 6 | 190 | 1.0 | FAU | 13.8 | a. Silica-to-aluminum ratio of the synthesis solution.
b. The * symbol indicates the majority component for crystal mixtures.
c. The solution pH was measured prior to hydrothermal treatment

FIG. 25

Table IV. Syntheses using a molar ratio of 11 NaOH:190 H$_2$O with 7 days heating at 65 °C.

| Molar Composition | | | | Si/Al Ratio [a] | Crystal Phase(s) [b] | Solution pH [c] |
|---|---|---|---|---|---|---|
| SiO$_2$ | Al$_2$O$_3$ | NaOH | H$_2$O | | | |
| 1.0 | 1.0 | 11 | 190 | 0.5 | LTA | 14.0 |
| 2.0 | 1.0 | 11 | 190 | 1.0 | LTA | 13.9 |
| 3.0 | 1.0 | 11 | 190 | 1.5 | FAU | 13.9 |
| 4.0 | 1.0 | 11 | 190 | 2.0 | FAU | 13.9 |
| 5.0 | 1.0 | 11 | 190 | 2.5 | FAU | 14.0 |
| 7.33 | 5.50 | 11 | 190 | 0.7 | LTA | 13.7 |
| 7.33 | 4.13 | 11 | 190 | 0.9 | LTA | 13.6 |
| 7.30 | 1.85 | 11 | 190 | 2.0 | FAU | 15.0 |
| 7.33 | 0.91 | 11 | 190 | 4.0 | FAU | 13.6 |
| 5.5 | 3.0 | 11 | 190 | 0.9 | LTA | 15.0 |
| 5.5 | 1.85 | 11 | 190 | 1.5 | FAU*,LTA | 13.8 |
| 4.0 | 3.0 | 11 | 190 | 0.7 | LTA | ----- |
| 3.7 | 1.85 | 11 | 190 | 1.0 | LTA | 13.9 |
| 2:2 | 2.0 | 11 | 190 | 0.5 | LTA | 15.0 |
| 2.0 | 0.63 | 11 | 190 | 1.6 | FAU*,LTA | 13.9 |
| 2.0 | 0.25 | 11 | 190 | 4.0 | FAU*, LTA | 13.9 |
| 0.87 | 0.79 | 11 | 190 | 0.5 | LTA | 15.0 |
| 3.6 | 0.45 | 11 | 190 | 4.0 | FAU*, LTA | ----- |
| 0.6 | 0.30 | 11 | 190 | 1.0 | FAU | ----- | a. Silica-to-aluminum ratio of the synthesis solution.
b. The * symbol indicates the majority component for crystal mixtures.
c. The solution pH was measured prior to hydrothermal treatment

FIG. 26

Table V. Syntheses using a molar ratio of 11 NaOH:190 $H_2O$ with 7 days heating at 80 and 95 °C.

| Molar Composition | | | | Si/Al Ratio [a] | Crystal Phase(s) [b] | Solution pH [c] | T (°C) |
|---|---|---|---|---|---|---|---|
| $SiO_2$ | $Al_2O_3$ | NaOH | $H_2O$ | | | | |
| 1 | 1 | 11 | 190 | 0.5 | LTA | 13.9 | 80 |
| 2 | 1 | 11 | 190 | 1.0 | FAU*, LTA | 14.0 | 80 |
| 3 | 1 | 11 | 190 | 1.5 | FAU | 14.0 | 80 |
| 4 | 1 | 11 | 190 | 2.0 | FAU | 14.0 | 80 |
| 5 | 1 | 11 | 190 | 2.5 | FAU | 14.0 | 80 |
| 3 | 1 | 11 | 190 | 1.5 | FAU, SOD, GIS | | 95 | a. Silica-to-aluminum ratio of the synthesis solution.
b. The * symbol indicates the majority component for crystal mixtures.
c. The solution pH was measured prior to hydrothermal treatment

FIG. 27

Table VI. Syntheses using a molar ratio of 11 NaOH:190 $H_2O$ with 7 days heating at 100 °C.

| Molar Composition | | | | Si/Al Ratio [a] | Crystal Phase(s) [b] | Solution pH [c] |
|---|---|---|---|---|---|---|
| $SiO_2$ | $Al_2O_3$ | NaOH | $H_2O$ | | | |
| 1 | 1 | 11 | 190 | 0.5 | SOD | 13.9 |
| 4 | 3 | 11 | 190 | 0.7 | SOD*, LTA | 13.9 |
| 2 | 1 | 11 | 190 | 1.0 | SOD*, GIS | 14.1 |
| 3.2 | 1.85 | 11 | 190 | 0.9 | GIS, SOD, CAN | 13.9 |
| 3 | 1 | 11 | 190 | 1.5 | SOD*, GIS | 14.2 |
| 4 | 1 | 11 | 190 | 2.0 | GIS*, SOD | 14.3 |
| 5 | 1 | 11 | 190 | 2.5 | GIS | 13.9 |
| 5.8 | 1.65 | 11 | 190 | 1.9 | GIS | 13.9 | a. Silica-to-aluminum ratio of the synthesis solution.
b. The * symbol indicates the majority component for crystal mixtures.
c. The solution pH was measured prior to hydrothermal treatment

FIG. 28

Table VII. Syntheses using a molar ratio of 11 NaOH:190 $H_2O$ with 21 days heating at 180 °C.

| Molar Composition | | | | Si/Al Ratio [a] | Crystal Phase(s) [b] | Solution pH [c] |
| --- | --- | --- | --- | --- | --- | --- |
| $SiO_2$ | $Al_2O_3$ | NaOH | $H_2O$ | | | |
| 4.1 | 0.0025 | 11 | 190 | 82 | ANA | 13.82 |
| 4.1 | 0.05 | 11 | 190 | 41 | ANA | 13.80 |
| 4.1 | 0.15 | 11 | 190 | 13.7 | ANA | 14.25 |
| 2.5 | 0.15 | 11 | 190 | 8.3 | CAN | 13.63 |
| 1.6 | 0.2 | 11 | 190 | 4.0 | ---- | 13.69 |
| 4.1 | 0.35 | 11 | 190 | 5.9 | CAN*, ANA | 14.18 |
| 7 | 0.35 | 11 | 190 | 10 | ANA | 13.44 |
| 1.65 | 0.375 | 11 | 190 | 2.2 | ANA | ----- |
| 3.2 | 0.455 | 11 | 190 | 3.5 | ----- | 13.69 |
| 5.4 | 0.515 | 11 | 190 | 5.2 | ----- | 13.74 |
| 4 | 0.6 | 11 | 190 | 3.3 | CAN*, ANA | 14.24 |
| 7.1 | 0.9 | 11 | 190 | 3.9 | ANA | 13.63 |
| 1 | 1 | 11 | 190 | 0.5 | CAN | 13.88 |
| 2 | 1 | 11 | 190 | 1 | CAN | 13.86 |
| 3 | 1 | 11 | 190 | 1.5 | CAN | 13.84 |
| 4 | 1 | 11 | 190 | 2 | CAN | 13.76 |
| 5 | 1 | 11 | 190 | 2.5 | CAN*, ANA | 13.70 |
| 6.1 | 1.25 | 11 | 190 | 2.4 | ----- | 13.76 |
| 7.5 | 1.55 | 11 | 190 | 2.4 | ANA | 13.70 |
| 4 | 1.9 | 11 | 190 | 1.1 | CAN | 13.58 |
| 6 | 2 | 11 | 190 | 1.5 | ------ | 13.76 |
| 1.7 | 2.1 | 11 | 190 | 0.4 | CAN*, SOD | 13.67 |
| 7.8 | 2.445 | 11 | 190 | 1.6 | ------ | 13.78 |
| 4 | 2.9 | 11 | 190 | 0.7 | CAN*, SOD | 13.88 |
| 6.9 | 3.45 | 11 | 190 | 1 | ------ | 13.78 | a. Silica-to-aluminum ratio of the synthesis solution
b. The * symbol indicates the majority component for crystal mixtures
c. The solution pH was measured prior to hydrothermal treatment

FIG. 29

Table VIII. Syntheses using a molar ratio of 32 NaOH: 190 H$_2$O at various times and temperatures.

| Molar Composition | | | | Si/Al Ratio [a] | Crystal Phase(s) [b] | Solution pH [c] |
| --- | --- | --- | --- | --- | --- | --- |
| SiO$_2$ | Al$_2$O$_3$ | NaOH | H$_2$O | | | |
| 4.27 | 0.85 | 32 | 190 | 2.5 | SOD | 13.75 |
| 1.7 | 0.85 | 32 | 190 | 1 | SOD | 13.44 |
| 11.54 | 1.62 | 32 | 190 | 3.6 | SOD | 14.91 |
| 15.8 | 2.56 | 32 | 190 | 3.1 | SOD*, GIS, FAU | ----- |
| 20.94 | 2.56 | 32 | 190 | 4.1 | SOD*, GIS, FAU | ----- |
| 25.64 | 2.56 | 32 | 190 | 5.0 | GIS*, FAU | ----- |
| 2.99 | 2.99 | 32 | 190 | 0.5 | SOD | 13.52 |
| 11.13 | 3.7 | 32 | 190 | 1.5 | SOD | 14.67 |
| 7.69 | 7.69 | 32 | 190 | 0.5 | SOD | 13.86 |
| 20.98 | 8.73 | 32 | 190 | 1.2 | ----- | ----- |
| 20.98 | 15.82 | 32 | 190 | 0.7 | ----- | ----- |

FIG. 30

Table IX. Syntheses at various compositions (molar ratio Z NaOH:190 H₂O), times, and temperatures.

| Molar Composition | | | | Si/Al Ratio [a] | Crystal Phase(s) [b] | Solution pH [c] | Time (hour) | T (°C) |
|---|---|---|---|---|---|---|---|---|
| $SiO_2$ | $Al_2O_3$ | NaOH | $H_2O$ | | | | | |
| 4 | 1 | 11 | 190 | 2 | Amorphous | 13.7 | 0 | 65 |
| 4 | 1 | 11 | 190 | 2 | LTA | 13.7 | 6 | 65 |
| 4 | 1 | 11 | 190 | 2 | FAU*, LTA | 13.8 | 12 | 65 |
| 4 | 1 | 11 | 190 | 2 | FAU | 13.8 | 24 | 65 |
| 3 | 1 | 11 | 190 | 1.5 | CAN, GIS, SOD | 13.9 | 168 | 120 |
| 4.5 | 0.9 | 32 | 190 | 5 | EMT/FAU | 12.9 | 2 | 65 |
| 4.5 | 0.9 | 32 | 190 | 5 | SOD | ----- | 6 | 65 |
| 3 | 1 | 11 | 190 | 1.5 | FAU*, LTA | 13.7 | 24 | 95 |
| 3 | 1 | 11 | 190 | 1.5 | FAU*, LTA, SOD | 13.7 | 48 | 95 |
| 3 | 1 | 11 | 190 | 1.5 | FAU*, GIS, LTA, SOD | 13.7 | 72 | 95 |
| 3 | 1 | 11 | 190 | 1.5 | FAU, GIS, SOD | 13.7 | 168 | 95 | a. Silica-to-aluminum ratio of the synthesis solution.
b. The * symbol indicates the majority component for crystal mixtures
c. The solution pH was measured prior to hydrothermal treatment

FIG. 31

Table X. Syntheses in the literature that approximately match the conditions of FIG. 1B.

| Reference | Framework | Molar Composition | | | | T (°C) | Time (hours) |
|---|---|---|---|---|---|---|---|
| | | $SiO_2$ | $Al_2O_3$ | NaOH | $H_2O$ | | |
| Our work | GIS or SOD | X | Y | 11.0 | 190 | 100 | 168 |
| Okubo 2010 | SOD [a] | 0.81 | 0.4 | 23.1 | 190 | 100 | ~3 |
| Okubo 2003 | GIS [b] | 0.5 | 0.05 | 4.8 | 190 | 25 – 90 | > 1 |
| Okubo 1998 | GIS [c] | 1.12 | 0.11 | 4.8 | 190 | 100 | > 1 |
| Zones 1988 | GIS | 5.5 | 0.17 | 5.3 | 190 | 135 | 72 |
| Dwyer 1979 | GIS | 5.7 | 0.36 | 22.3 | 190 | 100 | 239 | a. LTA forms within 100 min with a full transition to SOD with increased heating time
b. 1 day aging required to obtain pure FAU (less aging yields some SOD and more aging yields GIS)
c. 1 day heating yields FAU/GIS mixture (FAU content increases with aging)

FIG. 32

Table XI: Syntheses in the literature that approximately match the conditions in FIG. 1C.

| Reference | Framework | Molar Composition | | | | T (°C) | Time (hours) |
|---|---|---|---|---|---|---|---|
| | | $SiO_2$ | $Al_2O_3$ | NaOH | $H_2O$ | | |
| Our work | ANA or CAN | X | Y | 11.0 | 190 | 180 | 504 |
| Zones 1988 | ANA | 5.6 | 0.17 | 5.3 | 190 | 150 | 480 |
| Agger 2006 | ANA | 7.8 | 0.60 | 1.9 | 190 | 180 | 72 |
| Tatlier 2007 | ANA | 10.0 | 0.05 | 10.0 | 190 | 120 | 72 |
| Barrer 1970 | ANA | 760.0 | 190.0 | 380.0 | 190 | 230 | 96 |
| Wiersema 1996 | ANA | 6.5 | 0.08 | 13.0 | 190 | 130 – 160 | 6 |

FIG. 33

Table XII. Syntheses in the literature that approximately match the conditions in FIG. 17.

| Reference | Framework | Molar Composition | | | | T (°C) | Time (hours) |
| --- | --- | --- | --- | --- | --- | --- | --- |
| | | $SiO_2$ | $Al_2O_3$ | NaOH | $H_2O$ | | |
| Our work | FAU or LTA | X | Y | 6.0 | 190 | 65 | 168 |
| Navrotsky 2007 | LTA [a] | 1 | 1 | 5.0 | 190 | 25 | 3990 |
| Valtchev 2004 | FAU | 1 | 0.4 | 7.8 | 190 | 25 | < 6080 | a. Syntheses at 90 °C yielded the following crystal structures: (i) SOD with CAN (minor) at 7.4 NaOH: 190 $H_2O$; (ii) SOD with LTA (minor) at 5.0 NaOH: 190 $H_2O$; (iii) LTA with SOD (minor) at 3.7 NaOH: 190 $H_2O$.

FIG. 34

Table XIII. Syntheses in the literature that approximately match the conditions in FIG. 18.

| Reference | Framework | Molar Composition | | | | T (°C) | Time (hours) |
| --- | --- | --- | --- | --- | --- | --- | --- |
| | | $SiO_2$ | $Al_2O_3$ | NaOH | $H_2O$ | | |
| Our work | SOD | X | Y | 32.0 | 190 | 65 | 6 to 168 |
| Okubo 2008 | SOD [a] | 4 | 1 | 42.2 | 190 | 60 | < 5 |
| Buhl 2011 | SOD | 1.6 | 1.2 | 34.9 | 190 | 60 | < 96 |
| Mintova 2012 | EMT [b] | 4.1 | 0.8 | 31.6 | 190 | 30 | < 36 | a. shorter times yields LTA.
b. longer times yield SOD.

FIG. 35

Table XIV. Dissolution rates of silica particles (LUDOX) measured by dynamic light scattering.

| Molar Composition | | | | Temperature (°C) | Dissolution Rate (nm/min) |
|---|---|---|---|---|---|
| $SiO_2$ | $Al_2O_3$ | NaOH | $H_2O$ | | |
| 4 | 0 | 11 | 190 | 25 | 0.02 ± 0.01 |
| 4 | 0 | 11 | 190 | 35 | 0.19 ± 0.01 |
| 4 | 0 | 11 | 190 | 40 | 0.27 ± 0.03 |
| 4 | 0 | 11 | 190 | 42 | 0.38 ± 0.07 |
| 4 | 0 | 11 | 190 | 45 | 0.55 ± 0.08 |
| 11.6 | 0 | 32 | 190 | 30 | 0.26 ± 0.04 |

FIG. 36

METHODS OF CONTROLLING POLYMORPHISM IN ORGANIC-FREE SYNTHESIS OF NA-ZEOLITES AND ZEOLITE CRYSTALS FORMED THEREFROM

CROSS-REFERENCE TO RELATED APPLICATIONS

This application claims benefit of U.S. provisional patent application Ser. No. 61/673,498, filed Jul. 19, 2012, which is herein incorporated by reference in its entirety.

BACKGROUND

Field

Implementations described herein generally relate to zeolite compositions and organic-free methods for forming such zeolites Description of the Related Art The global synthetic zeolite industry accounts for approximately $1.9 billion in revenue annually. The unique acidity, thermal stability, and shape-selectivity of nanoporous zeolites are beneficial for industrial applications such as catalysis. Zeolites are commonly used as catalysts in petroleum refining and chemicals production, and are highly active in the selective catalytic reduction of diesel and lean-burn vehicle emissions. Moreover, zeolites are commonly used for ion-exchange and are promising materials for selective separations. Research in both industry and academia seeks to design more rational synthetic approaches capable of improving zeolite properties for existing petrochemical processes, for emerging applications (such as $NO_x$ reduction in diesel emission), and for research objectives aimed to expand zeolite application to non-conventional markets, such as sensor technologies, drug delivery, and enantioselective catalysis and separations.

Among the 200 unique zeolite framework types, only a small percentage of structures are heavily utilized in commercial applications. One of the major economic factors in commercial zeolite synthesis is the use of organic structure-directing agents (SDAs), which are molecules possessing a size and shape commensurate with zeolite pores and channels. SDAs alter the kinetics of zeolite crystallization and guide the formation of the crystalline framework structure; however, the organic SDA becomes occluded within the pores and must be removed by a post-treatment calcinations process wherein the SDA is decomposed, which prevents the possibility of recycling (i.e., a high economic cost considering the price of the organics). As such, commercial processes rely on organic-free (often termed template-free) syntheses. The economic advantage of this approach is evident; however, there are two critical challenges that must be overcome: (i) there are only a handful of known zeolite crystal structures that can be synthesized in the absence of organic SDAs, and (ii) syntheses often result in the formation of two or more structures (i.e., crystal polymorphs or structures of similar composition). It is therefore desirable to establish synthesis conditions for zeolite growth that ensures the formation of a single (pure) crystal phase. To this end, the implementations disclosed herein provide growth conditions that lead to the formation of seven different zeolite framework structures, each in a pure crystal phase without any impurities.

SUMMARY

Implementations described herein generally relate to zeolite compositions and organic-free methods for forming such zeolites.

In one implementation, a method for forming cancrinite crystals is provided. The method comprises creating a solution comprising a Si/OH ratio of less than about 1 and a Si/Al ratio of at least about 0.5 to 1. The Si/Al ratio may be between about 0.5 to 1 and about 20 to 1. Creating a solution may comprise mixing a hydroxide source, a solvent, and a framework source precursor selected from an alumina source, a silica source, and combinations thereof. The silica source may be selected from the group consisting of colloidal silica, fumed silica, silica salts, metallic silicates, hydrates thereof, derivatives thereof and combinations thereof. The framework source precursor may be selected from the group consisting of: silica source, alumina source, silicoaluminate source, silicoaluminophosphate source, derivatives thereof and combinations thereof.

In another implementation, a method for forming sodalite crystals is provided. The method comprises creating a solution comprising a $H_2O$/NaOH ratio of at least about 4 to 1, a Si/OH ratio of less than about 1 and a Si/Al ratio of at least about 0.5 to 1. The Si/Al ratio may be between about 1 to 0.1 and 20 to 1. The sodalite crystal may have a high silicon content.

In another implementation, a composition of a zeolite comprising ANA crystals with an elongated platelet-like morphology is provided. The length of the ANA crystals may be about 4 µm. The ANA crystals may have a width of less than about 1 µm and a length of at least about 3 µm. The length of the ANA crystals may be about 3 µm or less.

In another implementation, a method of forming ANA crystals is provided. The method comprises creating a solution comprising a Si/OH ratio of less than about 1 and a Si/Al ratio of at least about 6 to 1. The Si/Al ratio may be between about 6 to 1 and about 40 to 1. The Si/Al ratio may be between about 6 to 1 and about 15 to 1.

One implementation disclosed herein is an efficient method of producing nearly pure cancrinite (CAN) in a hydroxide solution, in which the ratio of silicon to aluminum in the solution is between at least about 0.4 to 1 and up to at least about 40 to 1, and possibly higher. In some implementations, the ratio of silicon to aluminum in the solution is between at least about 0.5 to 1 and up to at least about 20 to 1. In some implementations, the ratio of silicon to aluminum in the solution is between at least about 0.55 to 1 and up to at least about 10 to 1. Using such silicon to aluminum ratios promotes catalyst stability and efficiency, allowing for the more rapid creation of cancrinite.

Another implementation disclosed herein is a method of reducing the concentration of water and increasing the concentration of NaOH in the solution to a $H_2O$/NaOH ratio of at least about 4 to 1 so that sodalite may be obtained at a relatively high concentration of silicon to aluminum in the solution, with a ratio of silicon to aluminum of at least about 0.5 to 1 and up to at least about 20 to 1. In some implementations, the ratio of $H_2O$/NaOH is from at least about 1 to 1 and up to at least about 12 to 1. In some implementations, the ratio of $H_2O$/NaOH is from at least about 4 to 1 and up to at least about 7 to 1. The method also results in the creation of sodalite crystals with a high silicon content (e.g., a molar Si/Al ratio greater than 1).

Another implementation disclosed herein is a method of forming thin platelet ANA crystals where the ratio of silicon to aluminum is between about 6 to 1 and about 15 to 1, and possibly at ratios of up to 40 to 1. In some implementations, the ratio of silicon to aluminum is between about 1 to 1 and about 40 to 1. In some implementations, the ratio of silicon to aluminum is between about 5 to 1 and about 15 to 1. In some implementations, the ANA platelets have a width from about 100 nm to 1,000 nm and a length from about 2 μm to about 4 μm. In one implementation described herein, the ANA platelets have a width of less than about 1 μm and a length of at least about 3 μm.

One implementation described herein involves the synthesis of phase pure FAU and LTA zeolites at different silicon-to-aluminum ratios. Syntheses are performed at temperatures of 25 to 70° C. and timescales ranging from one day to several weeks. The purity of the final crystal product is determined by the solution composition, which is defined as the molar ratio of silicon (Si), aluminum (Al), hydroxide ($OH^-$), and water ($H_2O$). In some implementations, synthesis may be performed at temperatures from about 25 to 90° C. In some implementations, synthesis may be performed at temperatures from about 60 to 70° C. Kinetic phase diagrams, which are ternary diagrams of Si—Al—OH plotted for different $H_2O:OH^-$ molar ratios, temperature, and time of synthesis are disclosed herein. The diagram for FAU and LTA consists of three regions consisting of phase-pure FAU, phase pure LTA, and binary mixtures of both crystals.

Another implementation disclosed herein is the synthesis of phase pure GIS and SOD zeolites at different silicon-to-aluminum ratios. Syntheses are performed at temperatures of 80 to 120° C. and timescales ranging from one day to several weeks. The initial structures formed in the synthesis are FAU and LTA, which dissolve over time to form GIS and SOD, respectively. In some implementations, synthesis may be performed at temperatures from about 90 to 110° C. A kinetic phase diagram is disclosed as a means of determining solution compositions leading to the formation of pure GIS, pure SOD, and binary mixtures of GIS and SOD.

An additional implementation disclosed herein is the synthesis of phase pure ANA and CAN zeolites at different silicon-to-aluminum ratios. Syntheses are performed at temperatures from about 180° C. to about 220° C. over timescales ranging from one to four weeks. The initial structures formed in the synthesis are FAU and LTA, which dissolve to form GIS and SOD, respectively. With additional heating, these crystals dissolve to form ANA and CAN, respectively. A kinetic phase diagram is disclosed as a means of determining solution compositions leading to the formation of pure ANA, pure CAN, and binary mixtures of ANA and CAN. Nearly pure cancrinite is formed in a solution in which the ratio of silicon to aluminum in the solution is between about 0.5 to 1 and about 20 to 1, and possibly higher.

Another implementation disclosed herein is the use of higher $H_2O:OH^-$ molar ratios (of at least about 4:1) in zeolite synthesis compositions to achieve the formation of phase pure GIS and SOD crystals at lower temperatures (e.g., 25 to 70° C.) and shorter synthesis times (1 to 7 days). Syntheses with X OH: 190 $H_2O$ molar ratios (where X>30) increases the rate of GIS and SOD formation. In some implementations, the $H_2O:OH^-$ molar ratios may be from about 4:1 to about 35:1. A kinetic phase diagram was developed to identify synthesis compositions for the formation of phase pure GIS and SOD under these conditions.

One implementation disclosed herein provides a method for synthesizing ANA crystals that are isolated and do not form large aggregates. Micron-sized ANA crystals can be synthesized as platelets with increased surface area exposing channel openings (i.e., increased access of sorbates to internal sites within the zeolite framework). In one disclosed herein, the ANA platelets have a width of less than about 1 μm and a length of at least about 3 μm. In the solutions used to create the ANA platelets, the ratio of silicon to aluminum is between about 6 to 1 and about 15 to 1, and possibly at ratios of up to 40 to 1. Moreover, conditions were identified for the formation of large (20-80 μm) ANA aggregates, which exhibit a polyhedral morphology.

The approach of using kinetic phase diagrams is applicable for zeolite synthesis that employs either hydroxide ($OH^-$) or fluoride ($F^-$) as a mineralizing agent.

Furthermore, the synthesis of phase pure zeolites is applicable to frameworks with different tetrahedral building units ($TO_4$) that include (but are not limited to) the T-atoms silicon, aluminum, phosphorus, germanium, and titanium. Silicon is the basic T-atom and others are commonly referred to as heteroatoms. Zeolites can have a host of compositions that include pure silica, a mixture of silicon and aluminum (silicoaluminate), a mixture of silicon-aluminum-phosphate (silicoaluminophosphate, SAPO), or a hybrid of these structures with occluded heteroatoms.

Furthermore, the synthesis of phase pure zeolites is applicable for a synthesis that employs inorganic additives that may be used for the purpose of supplying an extra-framework cation, such as (but not limited to), ammonium ($NH_4^+$), acid ($H^+$), alkali metals, transition metals, and salts.

Furthermore, the synthesis of phase pure zeolites is applicable for a synthesis that employs a variety of silica sources, such as (but not limited to) fumed silica, colloidal silica, silica salts, or tetraethylorthosilicate (TEOS). Likewise, a variety of reagents may be used for other heteroatoms (e.g., aluminum or phosphate sources).

Lastly, the addition of compounds is applicable for a zeolite synthesis irrespective of the solvent or the use of a template, such as (but not limited to) surfactant microemulsions, carbons and polymers, monoliths, self-assembled monolayers, functionalized surfaces, and porous substrates.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the invention can be understood in detail, a more particular description of the invention, briefly summarized above, may be had by reference to implementations, some of which are illustrated in the appended drawings and photographs through the detailed description below. It is to be noted, however, that the appended drawings illustrate only typical implementations of the invention and are therefore not to be considered limiting of its scope, for the invention may admit to other equally effective embodiments.

FIG. 2A is a scanning electron micrograph of zeolite crystals with FAU framework types;

FIG. 2B is a scanning electron micrograph of zeolite crystals with LTA framework types;

FIG. 23 depicts Table I which includes crystal structure information of zeolite networks;

FIG. 24 depicts Table II which includes zeolite framework structures prepared by organic free syntheses;

FIG. 25 depicts Table III which includes information for syntheses using a molar ratio of 6 NaOH: 190 $H_2O$ with 7 days heating at 65° C.;

FIG. 26 depicts Table IV which includes information for syntheses using a molar ratio of 11 NaOH: 190 $H_2O$ with 7 days heating at 65° C.;

FIG. 27 depicts Table V which includes information for syntheses using a molar ratio of 11 NaOH: 190 $H_2O$ with 7 days heating at 80° C. and 95° C.;

FIG. 28 depicts Table VI which includes information for syntheses using a molar ratio of 11 NaOH: 190 $H_2O$ with 7 days heating at 100° C.;

FIG. 29 depicts Table VII which includes information for syntheses using a molar ratio of 11 NaOH: 190 $H_2O$ with 21 days heating at 180° C.;

FIG. 30 depicts Table VIII which includes information for syntheses using a molar ratio of 32 NaOH: 190 $H_2O$ at various times and temperatures;

FIG. 31 depicts Table IX which includes information for syntheses at various compositions (molar ratio Z NaOH: 190 $H_2O$), times and temperatures;

FIG. 32 depicts Table X which includes information for syntheses in the literature that approximately match the conditions of FIG. 1B;

FIG. 33 depicts Table XI which includes information for syntheses in the literature that approximately match the conditions in FIG. 1C;

FIG. 34 depicts Table XII which includes information for syntheses in the literature that approximately match the conditions in FIG. 17;

FIG. 35 depicts Table XIII which includes information for syntheses in the literature that approximately match the conditions in FIG. 18;

FIG. 36 depicts Table XIV which includes information for the dissolution rates of silica particles measured by dynamic light scattering.

Figure 1A:
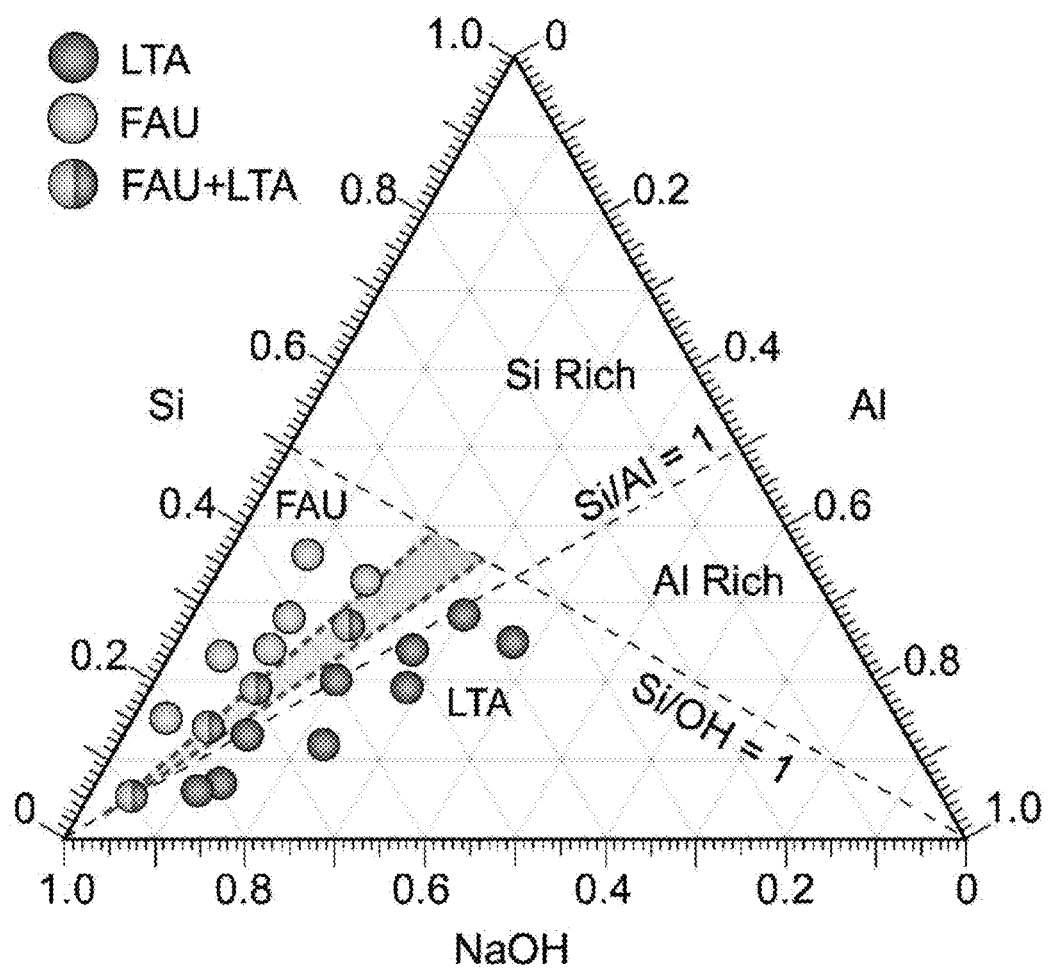
FIG. 1A depicts a kinetic ternary phase diagram plotting silicon, aluminum, and sodium hydroxide (NaOH) mole fractions for LTA and FAU formed at 65 degrees Celsius for seven days.

To facilitate understanding, identical reference numerals have been used, where possible, to designate identical elements that are common to the figures. It is contemplated that elements disclosed in one implementation may be beneficially utilized in other implementations without specific recitation.

DETAILED DESCRIPTION

Implementations described herein generally relate to zeolite compositions and organic-free methods for forming such zeolites. The methods disclosed herein create certain types of zeolite crystals more efficiently than other previously known methods. The methods also create certain types of zeolite crystals in a form and concentration not previously disclosed.

Zeolite crystals exhibit channels and cages with sizes on the order of 1.2 nm or less. The network of channels within the crystal structures can be oriented in 1-, 2-, and 3-dimensions. The pore size is typically defined by the number of tetrahedral-coordinated atoms on the perimeter of the pore opening. The atoms occupying the tetrahedral sites are commonly silicon and aluminum, but can be exchanged with "heteroatoms" such as Ge, P, Ga, etc. The common pore sizes for zeolite crystals are 8-, 10-, and 12-membered rings (MRs), often referred to as small, medium, and large pore zeolites, respectively. The catalytic activity of zeolites can be improved by an appropriate selection of pore size or tailoring the composition of tetrahedral atoms—notably the silicon-to-aluminum ratio (SAR). Aluminum with tetrahedral coordination exhibits a negative charge that is counterbalanced by an extra-framework ion. The latter is typically an alkali metal (e.g. $Na^+$, $K^+$, etc.) in zeolite syntheses. For catalytic processes, an ion-exchange post-treatment step is performed to substitute alkali metals with either a Brønsted acid ($H^+$) or a Lewis acid (e.g. transition metal), which serves as the active site for catalytic reactions. As such, crystal structure and SAR are factors that partially govern the performance of zeolites for industrial applications. Additional factors include zeolite crystal habit and particle size, which have additional benefits for other applications that include (but are not limited to) separations and ion-exchange.

There are many methods for synthesizing zeolites in the absence of SDAs. Crystal structures that have been synthesized under these conditions include the following frameworks (listed according to their 3-letter nomenclature assigned by the International Zeolite Association for different crystal space groups): ANA, BEA, CAN, EMT, EON, ERI, FER, GIS, LTA, LTL, MER, MFI, MOR, OFF, PHI, and SOD [11-46]. These syntheses often lead to mixtures of crystal structures. Methods reported in prior art offer little guidance regarding synthesis conditions necessary to achieve phase pure crystals. It may be desirable to optimize SAR and particle size simultaneously for a given crystal structure. Changes in the synthesis composition can influence particle shape and size. Examples include the silica concentration, solution pH, the silica source (reagent selection), and the inclusion of inorganic additives (e.g. salts). Moreover, process conditions, such as temperature and time of synthesis, can influence the size and crystal structure. The use of SDAs can avoid the formation of crystal polymorphs, but the use of organics is impractical for industrial applications due to the high cost of these reagents.

There have been many studies focused on synthesis of zeolites in organic-free media. Early work by Breck, Flanigen, and others examined organic-free syntheses of numerous frameworks, including FAU, LTA, SOD, GIS, CAN, and ANA. Studies in the 1970s established a pedagogical approach to analyzing organic-free zeolite synthesis (so-called $Na_2O$—$SiO_2$—$Al_2O_3$—$H_2O$ systems) that described general trends in crystal phase behavior using a ternary phase diagram for molar compositions of silicon, aluminum, and the extra-framework cation. The first diagrams were empirical, but provided more general guidelines for the selection of synthesis compositions and conditions. These works captured conditions for single phase purity, but did not wholly account for multiphase conditions and only examined the effects of one or two parameters at a time.

More recent studies have analyzed zeolite crystallization over a narrow range of parameters, such as synthesis time, temperature, water content, Si/Al ratio, reagents used, solution aging, and alkali cation effects.

As mentioned, polymorphism is common among organic-free syntheses. Zeolites are thermodynamically metastable relative to more dense structures, such as quartz. As such, zeolite crystallization often involves structural transformations from one metastable structure to a more thermodynamically stable structure. This process may be described by Ostwald's rule of stages, which is ubiquitous in many natural and synthetic crystallization processes. The most commonly studied zeolite phase transformation is that of zeolite A (LTA framework) to zeolite X or Y (FAU framework). There have been reports of many other phase transformations. Many of the studies involve the use of SDAs to control phase transformations, often providing pathways to synthesize less thermodynamically stable structures (i.e., kinetic pathways) and/or the formation of structures that otherwise could not be formed in the absence of SDA. Others have examined transformations of zeolite "seeds" submerged in highly alkaline solutions to promote dissolution and recrystallization into more thermodynamically stable structures in the absence of SDAs (subotic, etc.). Similar studies by Sano and others have performed in the presence of SDAs.

Therefore, there is a need to develop a more rational synthetic method for zeolites with the following criteria: (i) an approach that is easily adaptable to the synthesis of multiple zeolite framework types to achieve phase pure crystals, (ii) a method that can be tailored for each framework type to control zeolite crystal habit and particle size, (iii) a synthetic protocol that does not use expensive structure-directing agents, and (iv) a method that is easily amenable to current synthesis processes used to manufacture zeolites.

The crystalline zeolite materials described herein generally contain at least one material selected from silicate, aluminosilicate, silicoaluminophosphate, aluminumphosphate, but may also contain other elements. The synthesis mixture contains at least one framework source precursor or may contain multiple framework source precursors depending on the desired composition and framework-type of the zeolite. The framework source precursor may include a silica source, an alumina source, a phosphate source, an aluminosilicate source, a silicoaluminophosphate source, a titania source, a germania source, hydrates thereof, derivatives thereof, or combinations thereof. The framework source precursor may be derived from or contain a clay mineral, such as kaolinite, diatomite, or saponite, and utilized as source of silica or alumina. The framework source precursor generally contains a silica source, such as colloidal silica, fumed silica, silica salts, metallic silicates, hydrates thereof, derivatives thereof, or combinations thereof. Other exemplary silica sources include alkyl orthosilicate, orthosilicic acid, silicic acid, salts thereof, hydrates thereof, derivatives thereof, or combinations thereof. Alkyl orthosilicates that are useful as the silica source include tetramethyl orthosilicate, tetraethyl orthosilicate, tetrapropyl orthosilicate, tetrabutyl orthosilicate, salts thereof, hydrates thereof, derivatives thereof, or combinations thereof. In many examples, the framework source precursor also contains an alumina source, such as alumina, aluminum sulfate, aluminum nitrate, aluminum isopropoxide, aluminum butoxide, aluminum chloride, aluminum fluoride, aluminum phosphate, aluminum hydroxide, sodium aluminate, potassium aluminate, aluminates thereof, hydrates thereof, salts thereof, derivatives thereof, or combinations thereof. In several specific examples, the alumina source is aluminum sulfate hydrate or aluminum nitrate hydrate. In other implementations, the framework source precursor contains a phosphate source, such as phosphoric acid, trimethylphosphine, triethylphosphine, tripropylphosphine, tributylphosphine, trimethyl phosphate, triethyl phosphate, tripropyl phosphate, tributyl phosphate, aluminum phosphate, aluminophosphate, phosphates thereof, salts thereof, derivatives thereof, or combinations thereof.

The synthesis mixture may further comprise a solvent. The solvent generally contains water, an organic solvent, or combinations thereof. The water is generally deionized water and the organic solvent may be an alcohol, such as methanol, ethanol, propanol, butanol, or combinations thereof. The method may further include combining a mineralizing agent with the at least one framework source precursor, and the solvent to form the synthesis mixture. The mineralizing agent is generally a source of hydroxide ($OH^-$) or fluoride ($F^-$) for the synthesis mixture.

Zeolite growth solutions were prepared using molar ratios of X $SiO_2$:Y $Al_2O_3$: Z NaOH: 190 $H_2O$ by mixing sodium aluminate (available from Technical and ALFA AESAR®) and sodium hydroxide (98%, SIGMA-ALDRICH®) in deionized water (DI, 18.2 M Ω). This solution was stirred until homogenous and LUDOX® AS-40 colloidal silica (40%, SIGMA-ALDRICH®) was added as the silica source. Solutions were stirred for 24 hours prior to being placed in a TEFLON® liner, which was capped and placed in a stainless steel autoclave. The temperature was maintained at 65-180° C. using a Thermo Scientific™ Precision™ oven. Autoclaves were removed after heating for times ranging from 30 minutes to 21 days. Upon removal from the oven, the autoclave was cooled to ca. 25° C. in a water bath for 1 hour. The solid crystals were recovered by three cycles of centrifugation and washing (DI water), each at 5° C. and 12,000 rpm for 45 minutes using an AVANTI® J-E centrifuge available from Beckman Coulter. The gel product was dried in air at room temperature overnight prior to analysis.

Kinetic phase diagrams were constructed from zeolite growth solutions at constant Z NaOH: 190 $H_2O$ molar ratios (where Z=6, 9, 22, and 32). The quantities of silica and alumina used in each synthesis were varied to adjust the $SAR_{(liq)}$ values. Experiments were restricted to solutions with Si/OH ratios less than unity and $SAR_{(liq)}$ values that spanned 0.5 (Al-rich) to 85 (Si-rich). Al-rich is defined as having a Si/Al less than 1 and Si-Rich is defined as having a Si/Al greater than 1.

Zeolite crystal structures were determined by powder X-ray diffraction using a Siemens D5000 X-Ray Diffractometer. The bulk crystal size and habit were analyzed by electron microscopy using a FEI-235 DualBeam™ Focused Ion Beam with a scanning electron microscope (SEM). Silicon-to-aluminum ratios (SAR) were determined using a JEOL JSM 6330F Field Emission SEM with electron dispersive spectroscopy (EDS) capability. Samples for SEM analysis were isolated from synthesis solutions removed from the oven (prior to centrifugation). Crystals were isolated from the supernatant by vacuum filtration using 0.2-µm membranes (Whitman). The filtrate was washed with DI water and dried in air at room temperature. Zeolite crystals on the membrane surface were transferred to a SEM sample disk containing carbon tape, and were coated with either gold or carbon (~10 nm layer).

Samples were extracted from growth solutions at periodic times during hydrothermal treatment for characterization by transmission electron microscopy (TEM). A FEI™ Tecnai™ G2 F20 Field Emission Transmission Electron Microscope (Texas A&M University, Microscopy and Imaging Center, College Station, Tex.) was used for all TEM analyses. Samples were extracted from a growth solution of molar composition 4.0 $SiO_2$:1.0 $Al_2O_3$:11 NaOH:190 $H_2O$ that had been aged at room temperature for 24 hours. Aliquots of the solution were diluted in DI water. A single droplet of this solution was placed on a copper grid and allowed to dry in air prior to TEM analysis.

The hydrodynamic diameter of LUDOX® particles in aluminum-free zeolite growth solutions were measured by dynamic light scattering (DLS) using a Brookhaven Instruments BI-2005M instrument. Samples were prepared with molar compositions of 4.0 $SiO_2$: 11 NaOH: 190 $H_2O$ and 11.6 $SiO_2$: 32 NaOH: 190 $H_2O$. After LUDOX® addition, the solution was stirred for 10 minutes until homogeneous and 10 mL of solution was placed in a plastic centrifuge tube. The tubes were suspended in a Julabo water bath regulated at 25.0±0.1° C. After 5 minutes of temperature equilibration, samples were removed at regular time intervals up to 504 hours for the 11 NaOH:190 $H_2O$ sample and 168 hours for the 32 NaOH:190 $H_2O$ sample. Particle concentrations were too high for direct DLS analysis. As such, an aliquot of the sample was diluted by adding 10 drops (~0.2 mL) of solution to 12 mL of DI water. The hydrodynamic diameter was obtained from an average of three measurements at 25° C. Built-in software provided by Brookhaven was used to fit the autocorrelation function by the method of cumulants, approximating the solution density and viscosity as water.

Figure 1B:
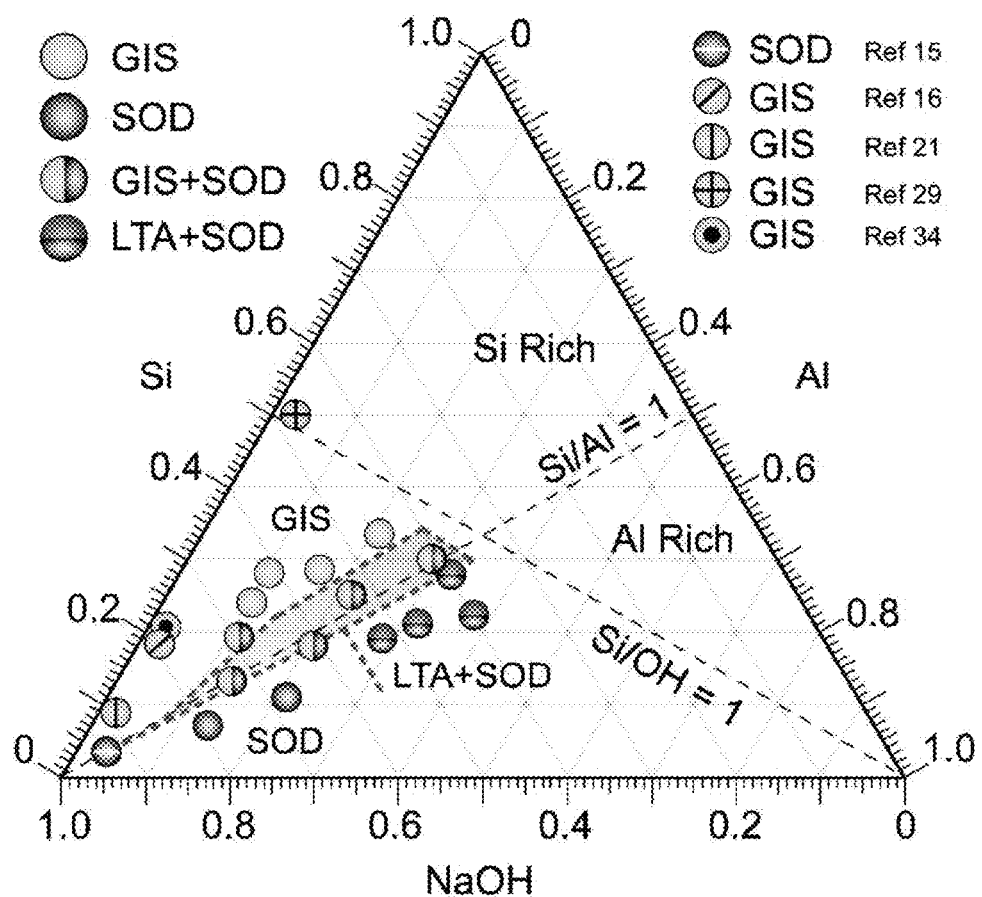
FIG. 1B depicts a kinetic ternary phase diagram plotting silicon, aluminum, and sodium hydroxide (NaOH) mole fractions for GIS and SOD formed at 100 degrees Celsius for seven days.
Figure 1C:
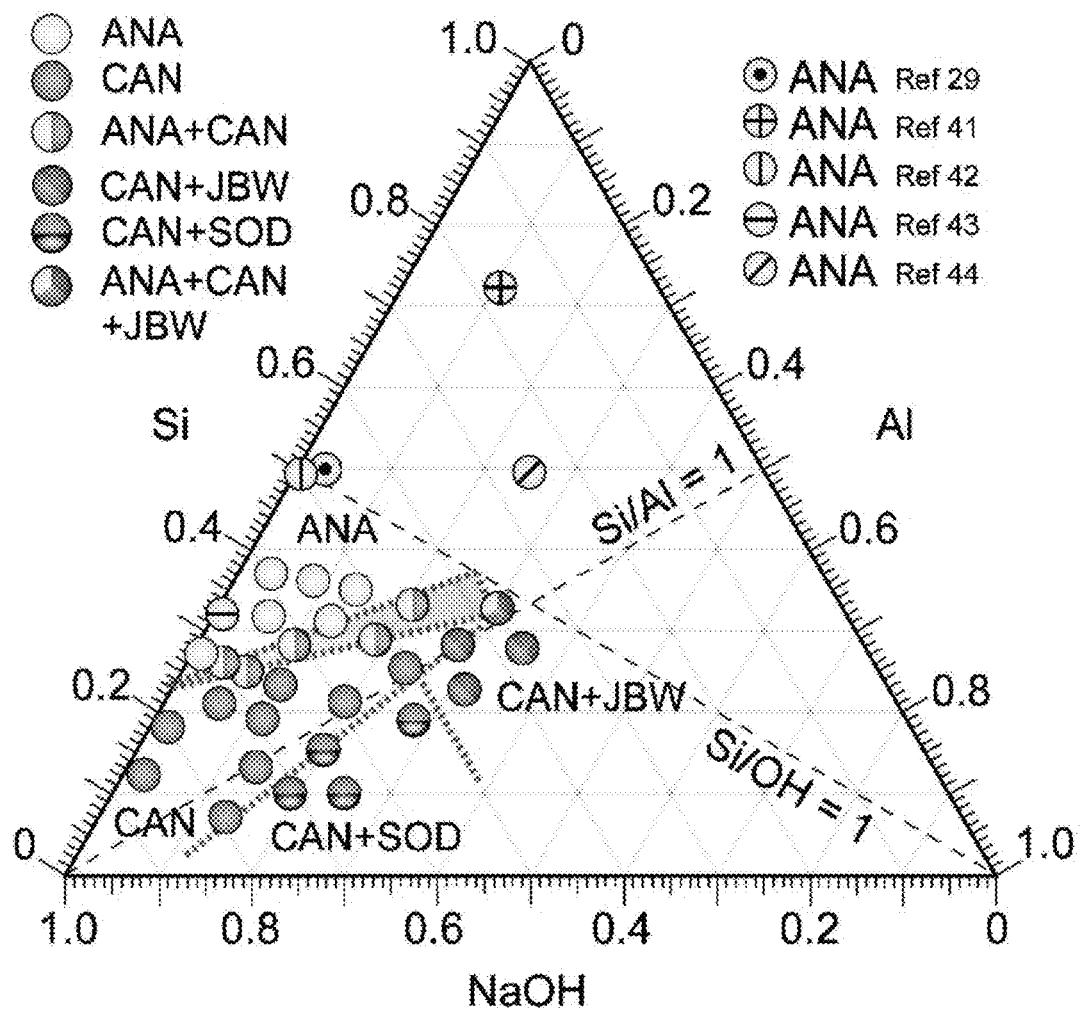
FIG. 1C depicts a kinetic ternary phase diagram plotting silicon, aluminum, and sodium hydroxide (NaOH) mole fractions for CAN and ANA formed at 180 degrees Celsius for twenty-one days.

FIGS. 1A-1C depict kinetic ternary phase diagrams of single and binary (shaded region) crystal structures for increasing synthesis temperature. The ternary diagrams plot silicon, aluminum, and hydroxide (NaOH) mole fractions. FIG. 1A depicts a kinetic ternary phase diagram plotting silicon, aluminum, and sodium hydroxide (NaOH) mole fractions for LTA and FAU formed at 65 degrees Celsius for seven days. FIG. 1B depicts a kinetic ternary phase diagram plotting silicon, aluminum, and sodium hydroxide (NaOH) mole fractions for GIS and SOD formed at 100 degrees Celsius for seven days. FIG. 1C depicts a kinetic ternary phase diagram plotting silicon, aluminum, and sodium hydroxide (NaOH) mole fractions for CAN and ANA formed at 180 degrees Celsius for twenty-one days. The zeolite crystal structure(s) of each sample were confirmed using powder XRD. All synthesis solutions employed $Na^+$ as the extra-framework cation and a mole ratio of 11 NaOH: 190 $H_2O$ (see Tables II-IV).

Kinetic Phase Diagrams.

Zeolite crystallization as a function of four synthesis variables: composition (i.e., silicon, aluminum, and hydroxide molar fractions), alkalinity (i.e., NaOH: $H_2O$ molar ratio), temperature, and time was systematically examined. All syntheses used Na+ as the extra-framework cation, recognizing that the selection of different alkali metals will alter both the kinetics and thermodynamics of zeolite crystallization. These studies primarily used colloidal silica (LUDOX®) as the Si source, although several experiments were performed using tetraethylorthosilicate (TEOS) as an alternative reagent. The studies also focused on highly alkaline solutions using an initial molar ratio of Si/OH$_{(liq)}$>1.0, which is consistent with many zeolite FAU and LTA synthesis protocols reported in the literature.

Herein, comparisons of zeolite crystallization at different reaction conditions are made using ternary diagrams (see FIGS. 1A-1C), which plot the molar ratios of silicon, aluminum, and hydroxide used to prepare zeolite growth solutions. The hydroxide concentration is specified as NaOH to emphasize the use of Na+ ions, which are introduced in equal concentration as hydroxide (the mineralizing agent). Zeolites are metastable crystals relative to more stable minerals, e.g. quartz, and if given enough time will gradually transform to more stable structures. It is important to note that these plots are not thermodynamic phase diagrams, but rather kinetic phase diagrams that identify regions where single phases and/or mixtures of multiple phases of zeolite crystal structures are formed at specific synthesis times and temperatures.

FIGS. 1A-1C compare three ternary diagrams of zeolites synthesized from solutions with identical molar ratios, X SiO$_2$: Y Al$_2$O$_3$: 11 NaOH: 190 H$_2$O, but different crystallization temperatures. At low temperature (65° C., FIG. 1A), FAU- and LTA-type zeolites preferentially crystallize in Si-rich and Al-rich solutions, respectively. The phase diagram highlights regions of pure FAU and LTA, and areas where binary mixtures of both zeolites form within 7 days of continuous hydrothermal treatment. Crystal structure(s) at each composition were identified by XRD analysis wherein Bragg peaks from extracted powders were compared to reference patterns of each zeolite framework type. The FAU crystals prepared at these conditions form aggregates where individual crystals with spheroidal morphology and sizes ranging from 10 to 50 nm form larger aggregates (FIG. 2A) with an average hydrodynamic diameter of 150 nm (as determined by DLS measurements). LTA crystals exhibit much larger size (approx. 1 μm) with a characteristic cubic habit (FIG. 2B).

Figure 37:
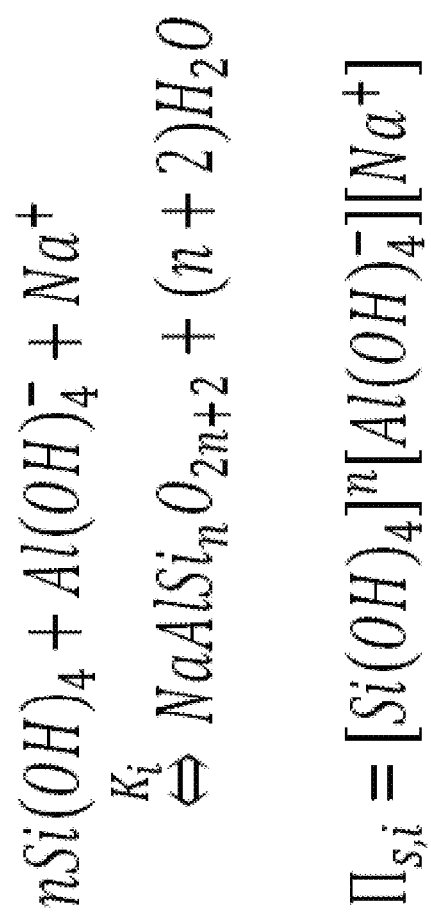
FIG. 37 depicts a thermodynamic solution model proposed by Sefcik and McCormick.

Sefcik and McCormick proposed a thermodynamic solution model, depicted in FIG. 37, to predict phase transitions between FAU and LTA using the solubility product, $\pi s, i$, for the condensation of silica and alumina to produce a zeolite of composition NaAlSi$_n$O$_{2n+2}$, where n is the silicon-to-aluminum ratio (SAR) of the solid.

The solubility products of FAU and LTA were shown to decrease linearly with increasing crystal SAR value. It was also reported that FAU and LTA exhibit similar $\pi s, i$ values in the range 1.0<SAR<1.3, but it was suggested that FAU is the more stable at higher SAR due to its lower solubility product (i.e., $\pi s,$FAU<$\pi s,$LTA). Model extrapolation to SAR values below unity (which is not feasible due to the Lowenstein rule) revealed a crossover point (i.e., $\pi s,$FAU>$\pi s,$ LTA) near SAR=1, which can explain why LTA is more stable than FAU in Al-rich solutions. Indeed, this hypothesis is consistent with the ternary phase diagram in FIG. 1A comparing zeolite structures synthesized at different growth solution SAR values, referred to as SAR(liq), which differ from the resulting SAR of the solid to as SAR(liq), which differ from the resulting SAR of the solid crystal product (e.g., see FIG. 9). The trends we observed for FAU and LTA synthesis at 65° C. are in good agreement with those reported by Sefcik and McCormick at 80° C. The phase diagram we report here reveals that LTA is favored at SAR(liq)<1.5, and that a binary FAU/LTA region is observed at 1.5<Si/Al(liq)<2.5. These observations are qualitatively consistent with the ternary diagram proposed by Sefcik and McCormick, with the exception that their two-phase region is narrower and centered at SAR(liq)=1.

FIG. 2A is a scanning electron micrograph of zeolite crystals with FAU framework types and FIG. 2B is a scanning electron micrograph of zeolite crystals with LTA framework types. Scanning electron micrographs of zeolite crystals with framework types (A) FAU and (B) LTA prepared in Si-rich (SAR(liq)=2.5) and Al-rich (SAR(liq)=0.5) solutions, respectively, using 11 NaOH: 190 H$_2$O solutions heated at 65 degrees Celsius for 7 days. Analysis of XRD peak widths for various compositions within the kinetic phase diagrams reveals that the crystal size decreases with increasing pH (see FIG. 9 and FIG. 10).

Past studies reveal that a suspension of FAU crystals subjected to temperatures above 80° C. for enough time undergo a structural phase transformation to a more thermodynamically stable GIS-type zeolite. Likewise, higher temperature induces a structural transformation of LTA crystals to SOD-type zeolite. This phenomenon has generated much debate surrounding the putative mechanism of zeolite phase transitions. One hypothesis proposed is a heterogeneous nucleation and growth of the new (more thermodynamically stable) crystal phase on the exterior surface of the old (less thermodynamically stable) crystal phase. Conversely, a second hypothesis is the homogeneous nucleation and growth of the second phase in solution. It is reasonable to suggest the actual mechanism may be a combination of both heterogeneous and homogeneous processes. In the present study, however, we make no inferences which mechanism best describes the phase transformations reported herein. To this end, our studies focus on constructing and understanding kinetic phase diagrams as a means of controlling zeolite crystal polymorphism.

To test the effect of temperature on the ternary phase diagram, we examined crystals prepared at 100° C. (FIG. 1B) and 180° C. (FIG. 1C). XRD analysis of zeolites prepared at 100° C. revealed the formation of GIS- and SOD-type frameworks in Si-rich and Al-rich solutions, respectively. The kinetic phase diagram (FIG. 1B) highlights regions where pure GIS and SOD form within 7 days of continuous hydrothermal treatment. Comparison of our results with five references that used similar synthesis compositions and reaction conditions (Table X) show consistent trends with the proposed kinetic phase diagram (FIG. 1B). GIS-type zeolite (zeolite P) is often reported as an impurity in FAU syntheses that forms at elevated temperatures (>200° C.) and/or increased synthesis time. Prior work has largely focused on either minimizing GIS formation in FAU syntheses, or the synthesis of maximum aluminum zeolite P (MAP) with SAR=1. The GIS-type framework is highly amenable to substitution of Si and Al tetrahedra with a variety of heteroatoms, such as Be, P, Ga, and Ge. Few studies, however, examined the synthesis of Na—AlSi-GIS from organic-free solutions (i.e., Na$_2$O—Al$_2$O$_3$—SiO$_2$—H$_2$O systems).

Zeolite P is a synthetic analogue of the naturally occurring gismondine, which has a flexible aluminosilicate framework with two crystal polymorphs—cubic (referred to as P1) and tetragonal (P2). A third phase (orthorhombic, P3), formally considered zeolite P, is referred to as merlinoite (MER-type zeolite). In addition, GIS exhibits close structural similarity to other zeolite-type frameworks, such as ACO, APC, APD, ATT, and DFT, all of which share common building schemes (i.e., 8-MR pores in one plane interconnected by 1-dimensional crankshaft units). GIS polymorphs exhibit similar X-ray diffraction patterns. Here we do not discern which of the two polymorphs is formed by the zeolite synthesis conditions employed in this study. The XRD patterns of GIS in the current study (FIG. 6(c)) closely match those reported in many other syntheses of zeolite P.

The GIS/SOD binary region in the kinetic phase diagram lies within the range of about 0.8<SAR(liq)<about 2.1 for syntheses using 11 NaOH: 190 $H_2O$ molar ratio. This two-phase region is larger than that of FAU/LTA in FIG. 1A, suggesting it is more difficult to achieve GIS crystals with high Al-content. Albert et al. and others report the synthesis Na-MAP (low silica Na—AlSi-GIS) crystals with SAR=1 using solutions heated at 100° C. for 5 days. Unfortunately the solution compositions in these studies are not provided, which prevents us from comparing their work with the current study. It is reasonable to suggest based on the phase diagram in FIG. 1B that Na-MAP is synthesized at higher OH molar ratios where the two-phase region approaches SAR(liq) values of unity.

Increasing the synthesis temperature to 180° C. results in the formation of ANA- and CAN-type frameworks in Si-rich and Al-rich solutions, respectively. The kinetic phase diagram (FIG. 1C) highlights regions where pure ANA and CAN form within 21 days of continuous hydrothermal treatment. The binary region is shifted to much higher SAR(liq) values (about 2.5<SAR(liq)<about 5.9) compared to phase diagrams at lower temperature. Structural transformations of GIS-to-ANA and SOD-to-CAN have been reported by others. As shown in FIG. 1C, ANA is generally synthesized at SAR(liq)>20, with some exceptions, such as a study by Barrer et al. that reports ANA crystallization at much lower silica content (SAR(liq)=2).

Figure 3A:
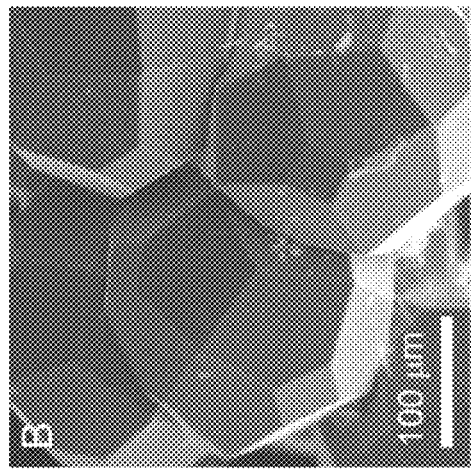
FIG. 3A is a scanning electron micrograph of zeolite crystals prepared in a Si-rich solution.
Figure 3B:
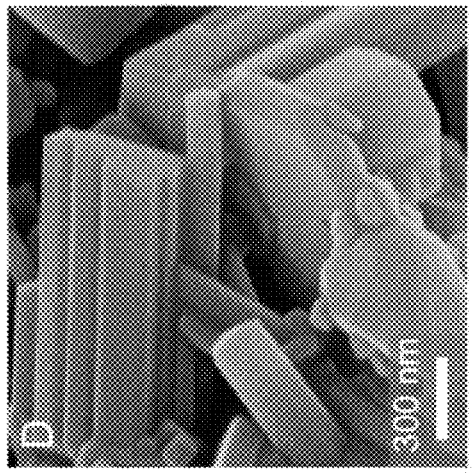
FIG. 3B is another scanning electron micrograph of zeolite crystals prepared in a Si-rich solution.
Figure 3C:
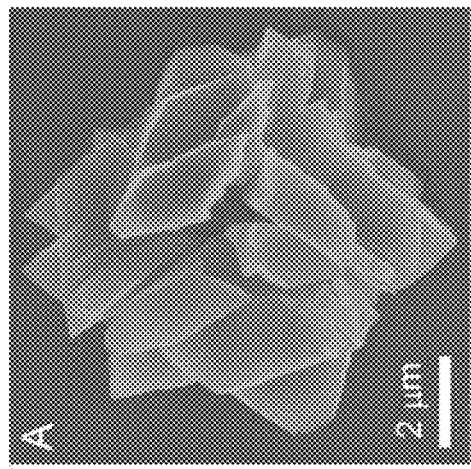
FIG. 3C is a scanning electron micrograph of zeolite crystals prepared in an Al-rich solution.
Figure 3D:
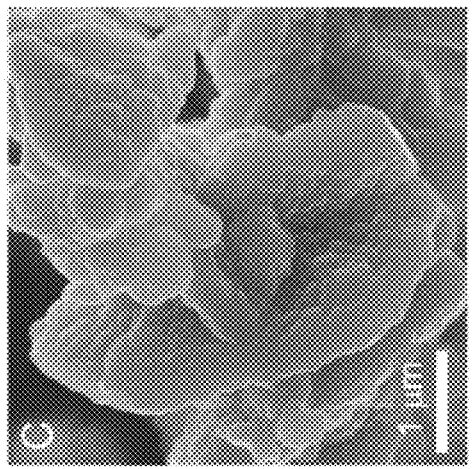
FIG. 3D is another scanning electron micrograph of zeolite crystals prepared in an Al-rich solution.
Figure 4B:
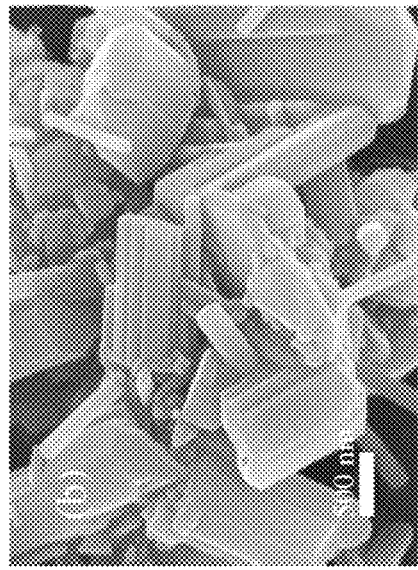
FIG. 4B is a scanning electron micrograph of zeolite crystals prepared in a solution having a SAR of 1.0.
Figure 4D:
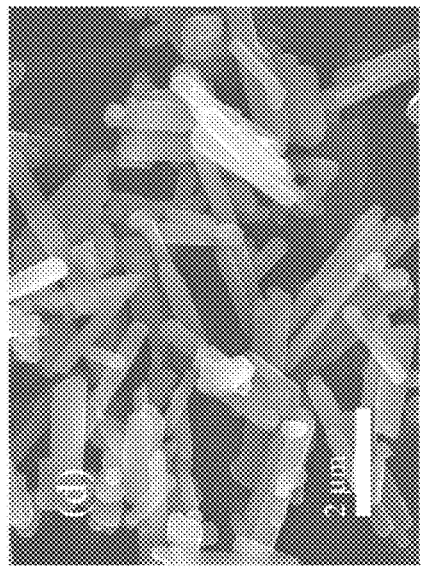
FIG. 4D is a scanning electron micrograph of zeolite crystals prepared in a solution having a SAR of 3.3.
Figure 4A:
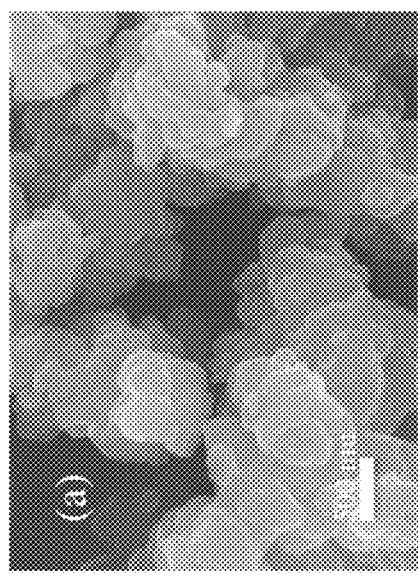
FIG. 4A is a scanning electron micrograph of zeolite crystals prepared in a solution having a silicon/aluminum ratio (SAR) of 0.5.
Figure 4C:
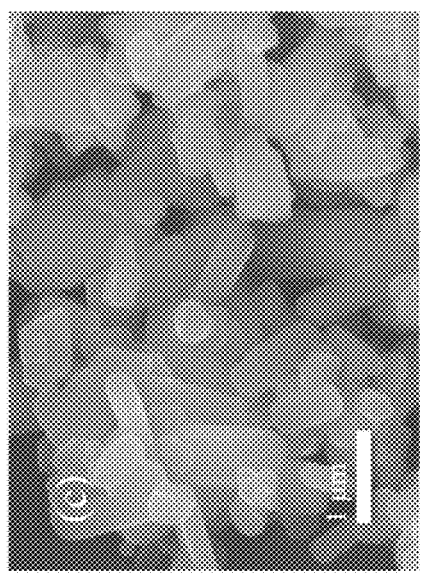
FIG. 4C is a scanning electron micrograph of zeolite crystals prepared in a solution having a SAR of 2.0.
Figure 4E:
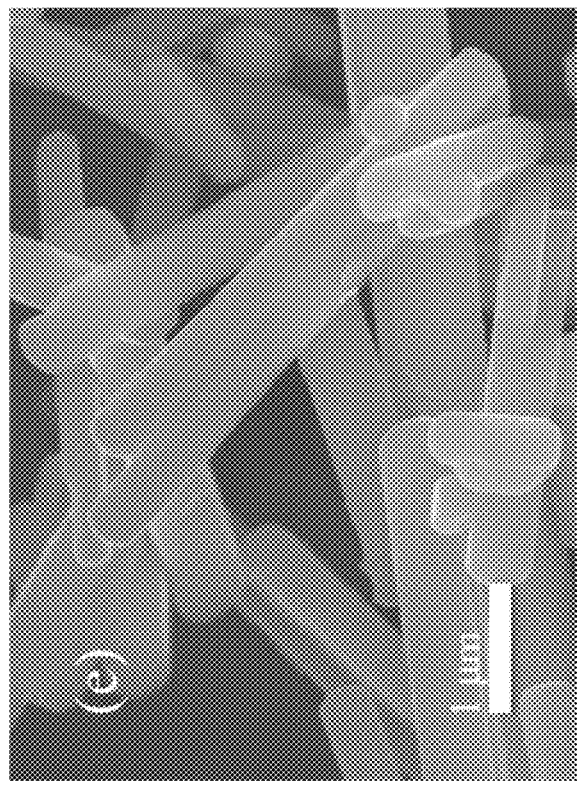
FIG. 4E is a scanning electron micrograph of zeolite crystals prepared in a solution having a SAR of 5.8.
Figure 4F:
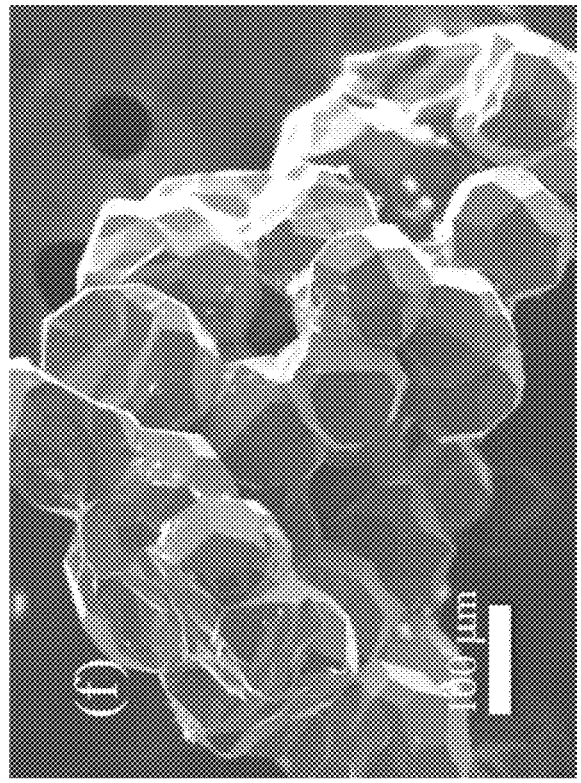
FIG. 4F is a scanning electron micrograph of zeolite crystals prepared in a solution having a SAR of 13.7.

FIG. 3A is a scanning electron micrograph of zeolite crystals prepared in a Si-rich solution. FIG. 3B is another scanning electron micrograph of zeolite crystals prepared in a Si-rich solution. FIG. 3C is a scanning electron micrograph of zeolite crystals prepared in an Al-rich solution. FIG. 3D is another scanning electron micrograph of zeolite crystals prepared in an Al-rich solution. Scanning electron micrographs of zeolite crystals prepared in Si-rich solutions (FIG. A and FIG. B) and Al-rich solutions (FIG. C and FIG. D) using 11 NaOH: 190 $H_2O$ solutions. Solutions heated at 100° C. for 7 days produced GIS crystals at SAR(liq)=2.5 (A) and SOD crystals at SAR(liq)=0.5 (C). GIS crystals are relatively monodisperse polycrystalline aggregates possessing a bipyramidal morphology, whereas SOD crystals appear to be aggregates of much smaller particles lacking a distinct crystal habit. Solutions heated at 180° C. for 21 days produced ANA crystals at SAR(liq)=13.7 (B) and CAN crystals at SAR(liq)=1 (D). ANA crystals exhibit a large polyhedral morphology, which has been suggested to be polycrystalline, whereas CAN crystals appear to be aggregates of much smaller, spheroidal-like particles.

The synthesis of ANA crystals at lower Si/Al ratios yields a population of dispersed (non-aggregated) crystals with an elongated platelet-like morphology. The size of the crystals is ~4 μm in length and <1 μm in width. The majority of ANA crystals reported in zeolite syntheses are aggregates (larger than 50 μm in dimension) with an exterior layer that grows on the surface of the aggregates to give the appearance of smooth, single crystals with polyhedral morphology. We observed the formation of these aggregates at larger Si/Al ratios.

FIGS. 4A-4F depict SEM images of crystals prepared at low and high Si/Al ratio. The crystals depicted in FIGS. 4A-4F are 21 day syntheses at 180° C. using a molar composition X $SiO_2$:Y $Al_2O_3$:11 NaOH:190 $H_2O$ for the following Si/Al (SAR) ratios: (A) SAR=0.5; (B) SAR=1.0; (C) SAR=2.0; (D) SAR=3.3; (E) SAR=5.8; and (F) SAR=13.7.

Figures 20A, 20B, 20C:
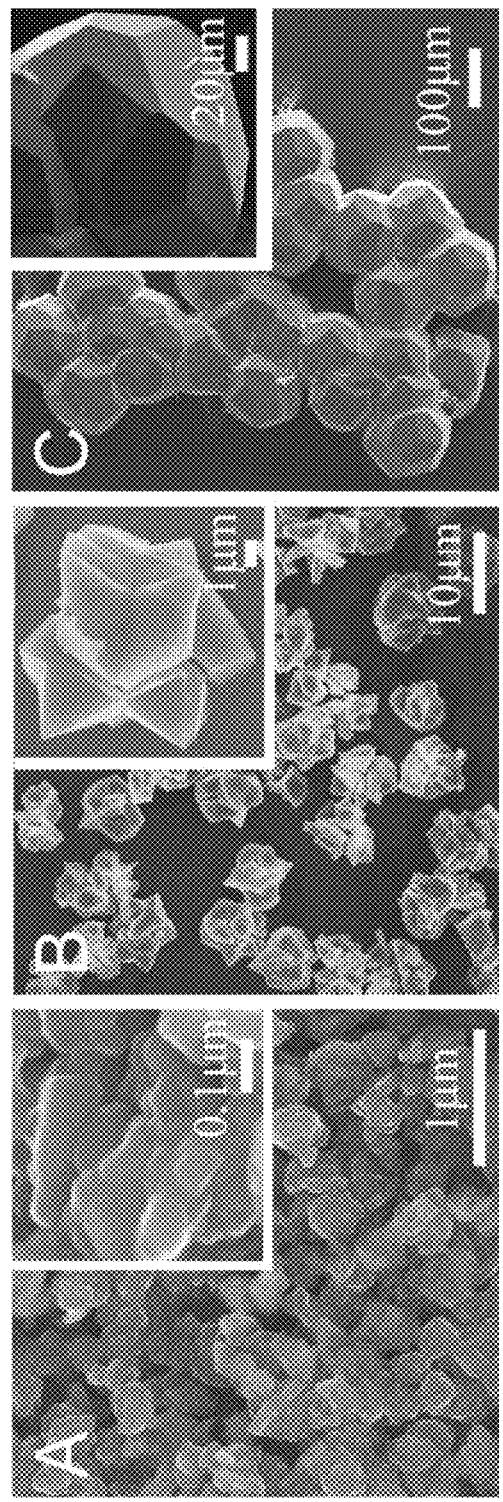
FIG. 20A depicts a representative scanning electron micrograph of FAU crystals.
FIG. 20B depicts a representative scanning electron micrograph of GIS crystals.
FIG. 20C depicts a representative scanning electron micrograph of ANA crystals.
Figures 20D, 20E, 20F:
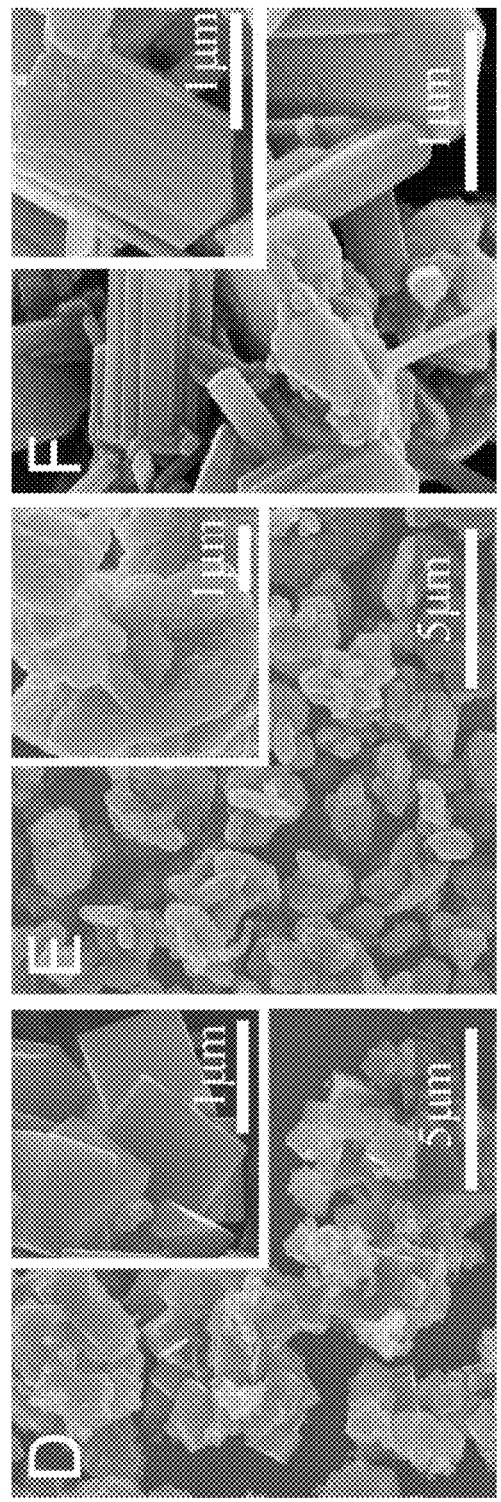
FIG. 20D depicts a representative scanning electron micrograph of LTA crystals.
FIG. 20E depicts a representative scanning electron micrograph of SOD crystals.
FIG. 20F depicts a representative scanning electron micrograph of CAN crystals.

There are distinct differences in crystal habit among zeolites synthesized in different regions of the ternary phase diagrams. Framework types formed in Si-rich solutions (FAU, GIS, and ANA) reveal that crystals of GIS and ANA zeolites are much larger than FAU zeolite. GIS zeolite (FIG. 3A) consists of 10-μm sized polycrystalline aggregates with remarkably uniform bipyramidal shape. ANA zeolite (FIG. 3B) forms 100-μm sized polyhedral crystals, which reportedly have polycrystalline interiors consisting of small ANA crystals tightly arranged into aggregates surrounded by a continuous solid (possibly single crystal) exterior shell. SEM images reveal that ANA polyhedra are fused together in what appear to be crystal intergrowths (see FIG. 20C). Although some aggregation is likely to occur during crystal extraction and drying for SEM imaging, the hierarchical ordering of GIS bipyramidal aggregates and the fused ANA polyhedral aggregates are consistently observed among their respective crystal populations, which suggests these structures form in situ.

Framework types formed in Al-rich solutions (LTA, SOD, and CAN) tend to be smaller in size. As previously discussed, LTA zeolite forms faceted cubic crystals with 1-μm dimension. SOD zeolite (FIG. 3C) forms highly aggregated particles consisting of spheroidal nano-crystals with a habit not easily identified from SEM images. CAN zeolite (FIG. 3D) forms faceted crystals with polydisperse morphologies that range from flat platelet to rod-like crystals of varying thicknesses and length, respectively.

Zeolite Phase Transformations.

The physical transformations between zeolite crystal phases in FIGS. 1A-1C at different temperatures can be rationalized within the context of Ostwald's rule of stages—a ubiquitous phenomenon wherein kinetic pathways often lead to the initial formation of a thermodynamically metastable structure that undergoes a series of recrystallization steps to form more progressively stable structures. These transformations occur by the gradual dissolution of one phase with simultaneous nucleation and growth of a second, more stable, phase. The progression of structural transformations is determined by a combination of thermodynamic and kinetic factors. Here, we begin with a discussion on the thermodynamics of zeolite crystallization. Navrotsky et al. performed systematic calorimetric studies of zeolite formation for a wide variety of crystal structures and compositions. They observed that the enthalpy of formation, $\Delta Hf$, of anhydrous zeolites exhibits an approximate linear relationship with its molar volume, V, whereby the thermodynamic stability increases (i.e., $\Delta Hf$ becomes more negative) with decreasing V. Interestingly, zeolite $\Delta Hf$ fall within a range of similar magnitude, which explains why kinetic factors play such an important role in determining the final crystal structure. Indeed, the majority of framework types reported in the literature require an organic structure-directing agent (SDA) to promote the condensation of aluminosilicate rings, cages, and/or other characteristic subunits of the bulk crystal structure.

Among the nearly 200 known zeolite types, few crystallize in the absence of a SDA. Only a small fraction of these structures have been synthetically prepared in organic-free media while slightly more have been identified as natural zeolites. It should be noted that in organic-free syntheses, presence of alkali and alkali earth metals has a profound effect on zeolite crystallization. Previous studies of anhydrous $M^{n+}$-zeolites (with $M=Li^+$, $Na^+$, $K^+$, $Cs^+$, $Ca^{2+}$, $Rb^{2+}$) by Navrotsky et al. revealed a large disparity in $\Delta Hf$ with changes in the extra-framework cation and other factors, including both the type and aluminum content of the crystal framework. Okubo et al. examined the effect of partially substituting $Na^+$ with $K^+$ in FAU syntheses and observed the formation of low-silica zeolite X (LSX) in solutions of SAR(liq)=1.0, which corresponds to the binary FAU/LTA region in FIG. 1A. As such, it is reasonable to expect $Na^+$-zeolite kinetic phase diagrams will differ from those employing cations other than sodium. Although this topic is not explored in this current study, it does have practical implications for applications where cations hinder molecular diffusion within the pores.

Table 1 lists the molar volumes for each zeolite discussed here. Assuming the proportionality $V\alpha-\Delta Hf$ for anhydrous aluminosilicate zeolites, we propose a schematic in FIG. 5 that illustrates the Ostwald step rule. We observed general trends for the zeolite phase transformations, which followed the progressions of FAU-GIS-ANA in Si-rich solutions and LTA-SOD-CAN in Al-rich solutions. The initial zeolites formed —FAU and LTA —have the highest molar volume (i.e., low-density frameworks), and are therefore the most thermodynamically unfavorable structures. Both FAU and LTA are 3-D zeolites constructed from the same basic building unit (sodalite cage, sod), which are connected by double-six and double-four membered rings, respectively. The second stage yields GIS and SOD, which have comparable molar volume but very different topology. SOD is a 0-D zeolite formed by the direct connection of sod building units, whereas GIS is a 3-D zeolite constructed from the gis building unit.

The third and final phase observed in this study produced ANA and CAN crystals, which have very different structures. CAN forms 1-D channels from can building units, whereas ANA forms an interconnected 3-D network of 8-MR channels. A pore opening is illustrated by the arrow 500 in FIG. 5; however, the tortuous pore topology renders it difficult to precisely visualize the channels from 2-dimensional drawings of this structure.

Figure 5:
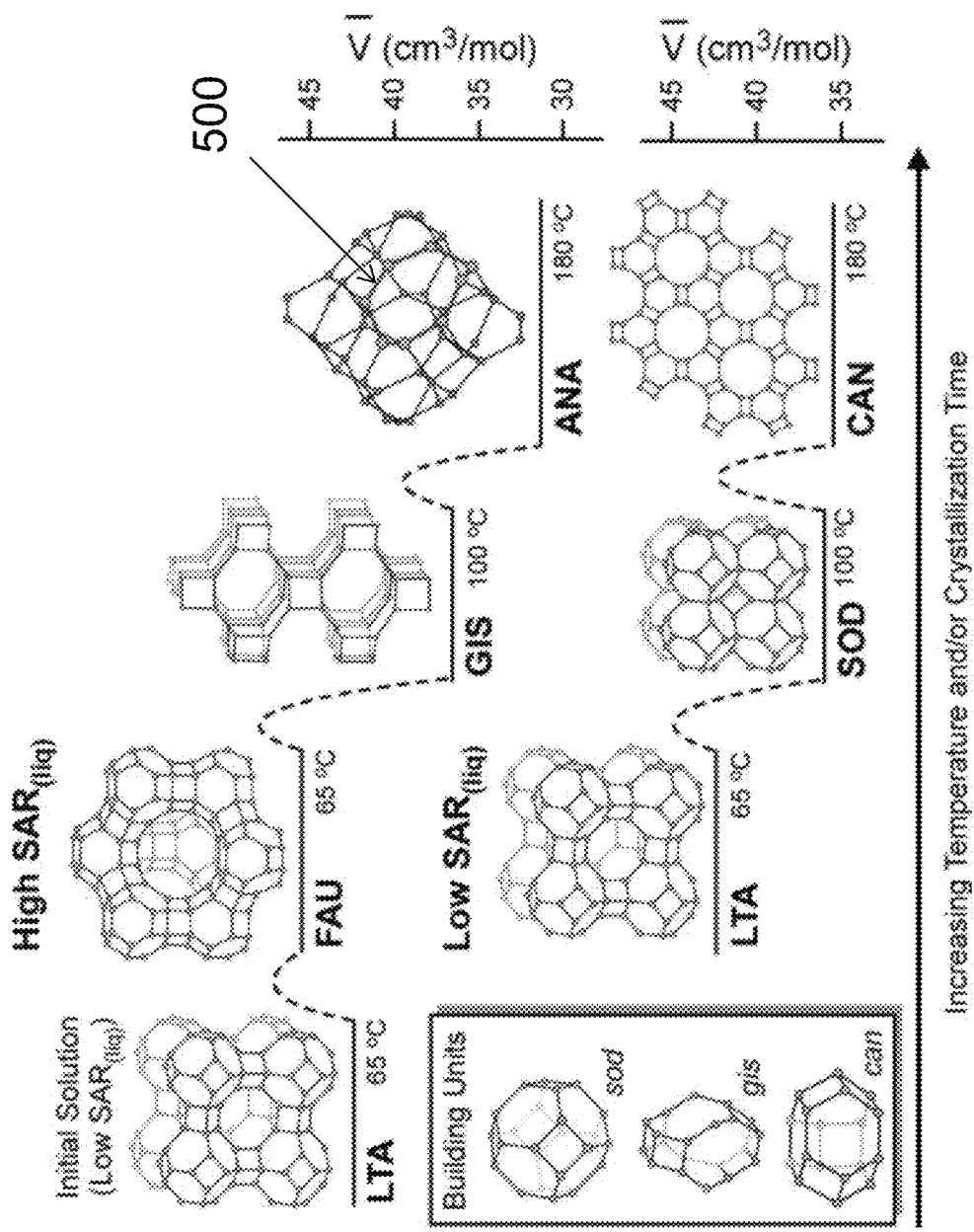
FIG. 5 depicts the relation between the transition in zeolite structure and Ostwald's rule of stages.

FIG. 5 depicts the relation between the transition in zeolite structure and Ostwald's rule of stages in high alkaline (Si/OH(liq)>1.0) solutions. The free energy of formation, $\Delta G$, for anhydrous zeolite structures is generally proportional to the molar volume, $\bar{V}$, of the framework type. The more dense the crystal structure, the more thermodynamically stable the zeolite. Trends here are based on experiments using colloidal silica as a Si source and synthesis solutions of molar ratio 11 NaOH: 190 H2O. Si-rich solutions with SAR(liq)>2.0 follow the trend LTA→FAU→GIS→ANA with increasing synthesis temperature and/or time, while Al-rich solutions with SAR(liq)<1.0 follow the trend LTA→SOD→CAN. The transition in zeolite structures follow Ostwald's rule of stages wherein metastable structures initially form and progressively transform to more thermodynamically-stable structures with time. A simple correlation between $\bar{V}$ and $\Delta G$ cannot account for the LTA-to-FAU transition in silica-rich growth solutions.

It should be noted that the schematic in FIG. 5 is specifically relevant for the synthesis compositions used in FIGS. 1A-1C (i.e., solutions of molar ratio 11 NaOH: 190 H2O). We did observe several trends, however, that do not exactly follow the stages depicted in FIG. 5, which include: (i) a transformation from GIS to CAN in high alkalinity regions of FIG. 1C; (ii) a EMT/FAU to SOD transformation in more concentrated synthesis solutions where the SOD phase spans both Si- and Al-rich regions of the kinetic phase diagram; and (iii) a transformation from more stable LTA to less stable FAU in Si-rich solutions. Here we address the first point and leave the second and third points for the following two sections, respectively.

Close inspection of FIG. 1C reveals that the transformation from GIS to ANA occurs at molar ratios of NaOH less than 0.7, while more alkaline solutions (i.e., bottom-left corner of the ternary diagram) results in a GIS-to-CAN transition. Since $V_{CAN} > V_{ANA}$, it is possible that kinetic factors are a reason for this switch. Likewise, it is feasible that the GIS-to-ANA transformation in alkaline solutions occurs at higher SAR(liq) values.

The schematic in FIG. 5 is a convenient way of visualizing the progression of stages for zeolite transformations; however, it is an oversimplification of the thermodynamic factors governing phase behavior in FIGS. 1A-C. The relationship $V\alpha-\Delta Hf$ used to describe the Ostwald step rule was adapted from a study of all-silica zeolites that did not account for framework aluminum, which can significantly alter zeolite $\Delta Hf$. Estimates of $\Delta Hf$ at different SAR(s) could be made using data for anhydrous zeolites in the literature, but a relationship between SAR(s) and solution composition is lacking and is difficult to quantify. A logical approach would be the use of in situ calorimetry, which has proven useful for probing thermal events in zeolite synthesis. An in situ calorimetric study of SOD revealed no calorimetric signal associated with the phase transformation from LTA to SOD. It was suggested that the difference in $\Delta Hf$ between LTA and SOD is too small (i.e., <1 kJ/mole) to distinguish by in situ calorimetry.

Predicting pseudo-equilibrium phases in ternary diagrams a priori is challenging. As previously mentioned, there are semi-quantitative methods for modeling zeolite phase behavior. Notably, the solution model previously discussed is a phenomenological approach that uses solubility products of Si/Al-zeolites as fitting parameters to approximate ternary phase diagrams. Sefcik and McCormick used a solution model to calculate a FAU/LTA phase diagram similar to the one in FIG. 1A. It is reasonable to suggest this model could also be applied to the GIS/SOD diagram in FIG. 1B, which exhibits similar phase behavior. Model calculations of the ANA/CAN diagram in FIG. 1C, however, may prove more challenging given its complexity relative to the others.

Constructing Phase Diagrams in 6-Dimensions.

The kinetic phase diagrams represented in FIGS. 1A-1C depict the effects of four parameters. A single ternary diagram accounts for solution composition, which are three parameters plotted as molar ratios of silicon, aluminum, and hydroxide. Ternary diagrams were extended in a 4$^{th}$ dimension by accounting for the temperature of hydrothermal treatment (FIGS. 1A-C). There are two additional parameters that were not previously investigated, which are synthesis time (referred to here as the total duration of hydrothermal treatment) and the water content (namely the NaOH:H2O molar ratio). To test the effect of these parameters, we performed experiments at varying time and alkalinity to extend the kinetic phase diagrams by two additional dimensions.

Figure 6:
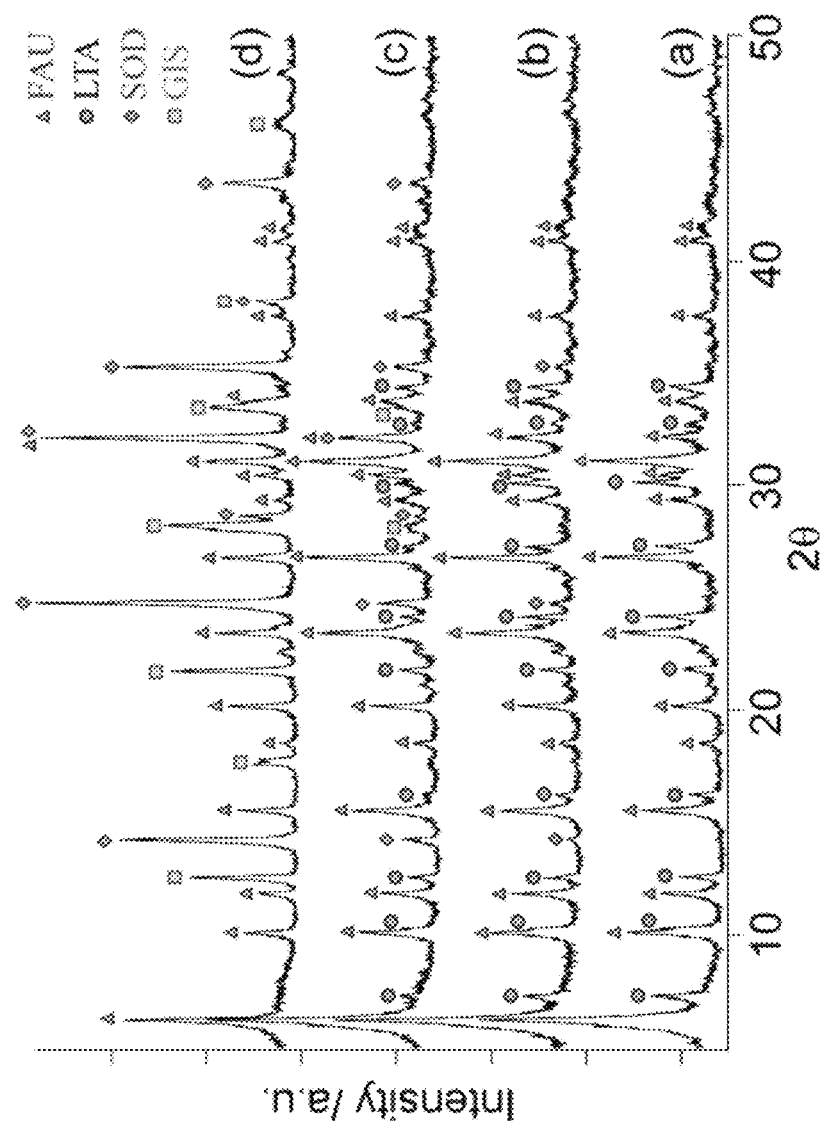
FIG. 6 depicts powder x-ray diffraction (XRD) patterns of zeolites having the structure type of FAU, LTA, SOD and GIS.

We will first discuss the influence synthesis time. The diagrams in FIGS. 1A-1C are based on XRD spectra of crystals extracted from growth solutions after 7 days of hydrothermal treatment for less dense structures (FAU, LTA, GIS, and SOD), and 21 days for more dense structures (ANA and CAN). The transformation from one zeolite to another involves a gradual dissolution of the less stable phase and growth of the more stable phase (both occurring simultaneously). The time required for complete transformation depends on the relative rates of crystallization for each structure. This is evident in ex situ XRD analyses of phase transformations where samples were removed at periodic times during hydrothermal treatment. Relative peak intensities in XRD spectra clearly show the emergence and disappearance of crystal phases. For example, FIG. 6 shows the temporal evolution of crystal products from a solution heated at 95° C. using a composition within the binary region of the GIS-SOD diagram. We observed that at any given time the final product contains as few as one and as many as four different crystal phases. Additional examples of time-elapsed studies are provided in FIG. 14.

Figure 16:
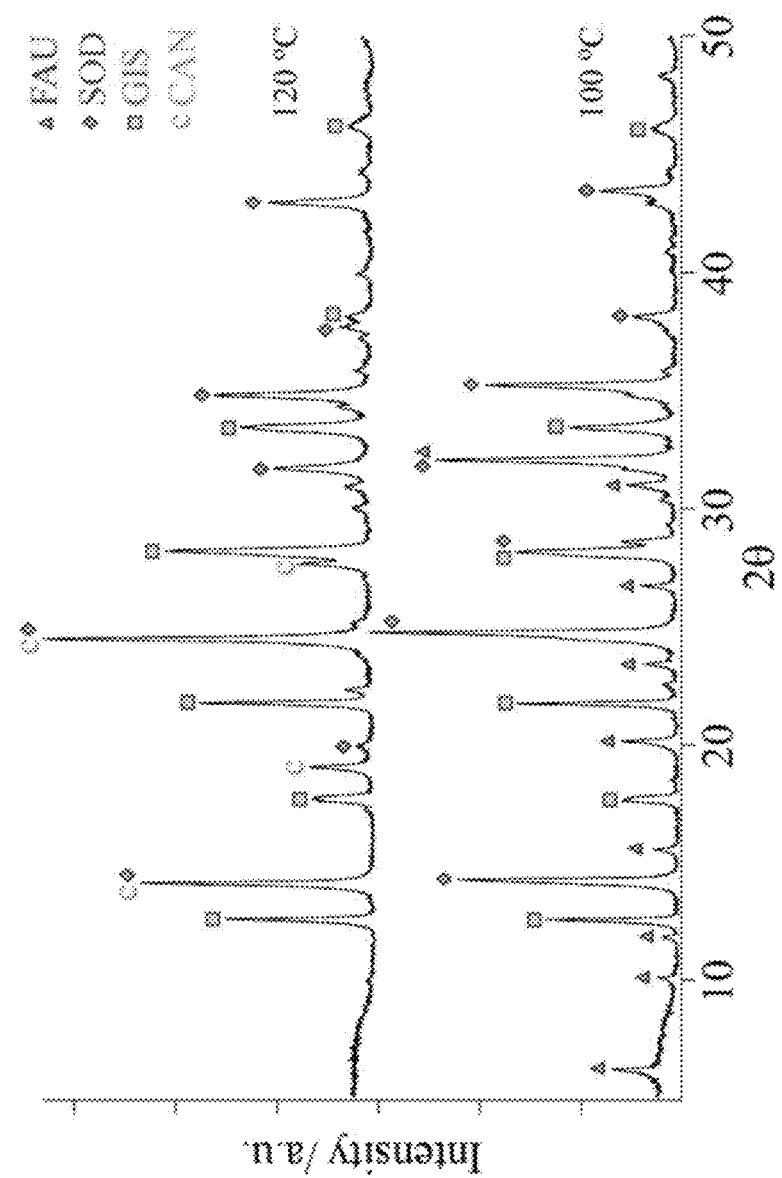
FIG. 16 depicts XRD patterns of samples synthesized for seven days at 100 and 120° C. using a molar composition 3 $SiO_2$: 1 $Al_2O_3$ ($SAR_{(liq)}$=1.5)

Time and temperature have similar effects on zeolite phase transformations. As such, we presented the progression of stages in FIG. 6 as an increase in either parameter. For instance, the synthesis of pure zeolite can be accomplished using either a long synthesis time at low temperature or a higher temperature with shorter synthesis time. This provides some flexibility in the design of pure zeolites to reach an optimal balance between convenience (i.e., less time) and economics (i.e., low temperature). We have observed that subtle changes in temperature can lead to significant changes in crystal products. A small reduction in temperature from 100° C. (FIG. 1B) to 95° C. (FIG. 6) results in a two phase GIS-SOD region for the former and a three phase GIS-SOD-FAU region for the latter. If the temperature is increased to 120° C., we also observe a three-phase region with CAN as the third phase (FIG. 16).

Figure 7:
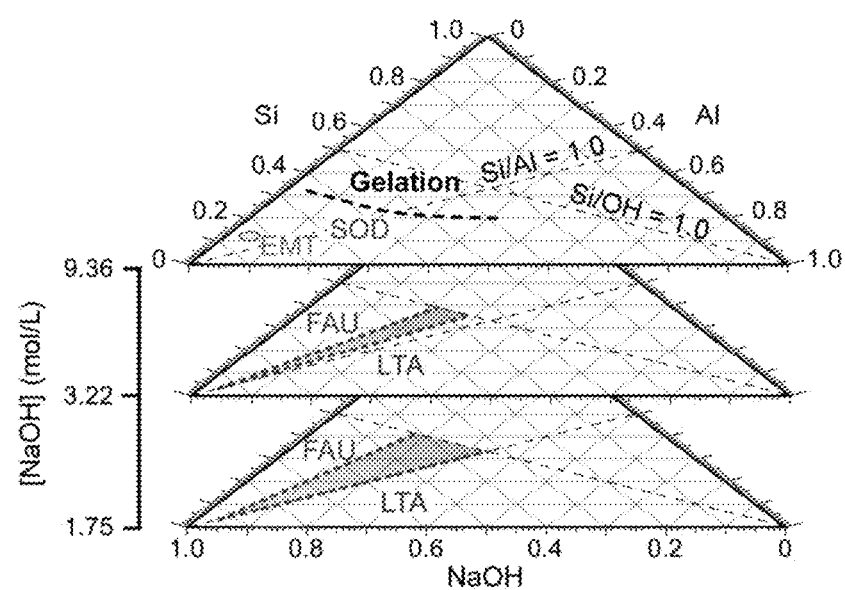
FIG. 7 depicts ternary phase diagrams for Na-zeolite synthesis at 65° C., which are constructed vertically in a fourth dimension corresponding to water content.

Now we will discuss the influence of the sixth parameter, water content, on the kinetic phase diagram. A decrease in water content alters solution alkalinity and the concentrations of both $SiO_2$ and $Al_2O_3$. It is uncertain which of these factors is more influential in determining the phase diagram. Here, changes in water content are referred to as an adjustment in the solution alkalinity (i.e., $NaOH:H_2O$ molar ratio) with the understanding that changes in total silicon and aluminum concentration are commensurate with that of hydroxide. FIG. 7 shows ternary phase diagrams for Na-zeolite synthesis at 65° C., which are constructed vertically in a fourth dimension corresponding to water content. Phase diagrams in FIGS. 1A-1C are based on syntheses using an initial NaOH concentration of 3.22 mol/L, which is equivalent to an 11 NaOH: 190 $H_2O$ molar ratio (redrawn in FIG. 7 as the middle diagram). Increasing the water content reduces the solution alkalinity and the concentrations of $SiO_2$ and $Al_2O_3$. Experiments at 1.75 mol/L NaOH (i.e., 6 NaOH: 190 $H_2O$), which is nearly half the hydroxide content as previous diagrams, reveals a similar phase FAU-LTA diagram, but with a much broader 2-phase region. Interestingly, we observed that decreasing the water content dramatically alters the phase diagram. Experiments at 9.36 mol/L NaOH (i.e., 32 NaOH: 190 $H_2O$) reveal that the FAU-LTA phase diagram shifts to pure SOD. The formation of SOD crystals was observed at intermediate alkalinity (22 NaOH: 190 $H_2O$), suggesting the shift in phase behavior occurs closer to 6 mol/L NaOH.

Concentrated solutions can form gels upon the initial addition of reagents. These gels become viscous slurries after they have been aged at ambient conditions with continuous stirring (e.g., 12 hours aging at 25° C.). The gelation region of the phase diagram in FIG. 7 was observed at lower NaOH mole ratios (i.e., Si/OH>0.4). It is reasonable to expect that the mechanism of zeolite phase transformation in this gelation region differs from those syntheses elsewhere within the phase diagram. To this end, we did not perform systematic studies of the gelation region; however, we did examine several gel syntheses at 65° C. and observed multiphasic regions—notably a 3-phase SOD-GIS-FAU region in close proximity to the gel boundary and a 2-phase GIS-FAU region further from the boundary (see FIG. 19).

Mintova and coworkers recently reported the synthesis of zeolite EMT at conditions similar to those presented in this study as shown in Table 1, the EMT framework is nearly identical to FAU. Both zeolites have 3-D porous networks formed by the connection of sodalite building units; and both structures have the same molar volume, which suggests their enthalpies of formation are nearly identical. Synthesizing EMT without an organic SDA is challenging. Recent findings of EMT formation elegantly showed that EMT crystallizes in organic-free media within 48 hours at low temperature (30° C.). Interestingly, the Si—Al—NaOH composition used to synthesize EMT in FIG. 7 is identical to the one employed by others to synthesize FAU crystals at 25° C. using higher water content (i.e., 7.6 NaOH: 190 $H_2O$). Our studies resolve this discrepancy by suggesting two factors are necessary to form EMT: low water content and low temperature. To test this, we reproduced the EMT synthesis at lower water content (6 NaOH: 190 $H_2O$) and observed the formation of FAU at temperatures less than 65° C. We also reproduced the EMT synthesis at higher temperature (65° C.). After 2 hours of heating, we observed crystals that exhibited powder XRD peaks similar to the ones reported for EMT (Noting that we were unable to resolve whether the products were EMT, FAU, or a mixture of both due to the low resolution of XRD patterns. See FIG. 14 for details). Within 6 hours of heating, we observed a phase transformation to SOD, revealing that low temperature and/or shorter time syntheses at higher temperature are required to form zeolite EMT. These studies also revealed that concentrated syntheses do not initially form LTA, and therefore bypass one step in the progression of phase transformations shown in FIG. 5.

FIG. 6 depicts powder x-ray diffraction (XRD) patterns of zeolites having the structure type of FAU, LTA, SOD and GIS. Powder XRD patterns of samples with molar composition 3 $SiO_2$: 1 $Al_2O_3$: 11 NaOH: 190 $H_2O$ (SAR(liq)=1.5) heated at 95° C. for (a) 24, (b) 48, (c) 72, and (d) 168 hours. At lower temperature (65° C.) this composition yields a FAU/LTA binary mixture (FIG. 1A). At higher temperature (100° C.), this composition yields a GIS/SOD binary mixture (FIG. 1B). At an intermediate temperature shown here, the transformations of LTA to SOD and FAU to GIS are incomplete. During 7 days of hydrothermal treatment at 95° C., XRD spectra reveal as few as two and as many as four different crystal phases.

Figure 8B:
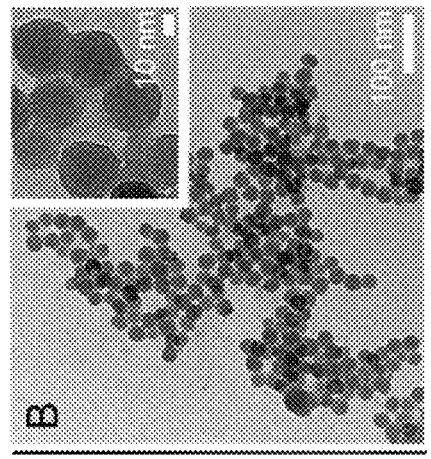
FIG. 8B depicts a transmission electron micrograph at low and high (inset) magnification of particles extracted from a solution with a molar ratio of 4.0 $SiO_2$: 1.0 $Al_2O_3$: 11 NaOH: 190 $H_2O$ that was aged at room temperature for 48 hours.
Figure 8A:
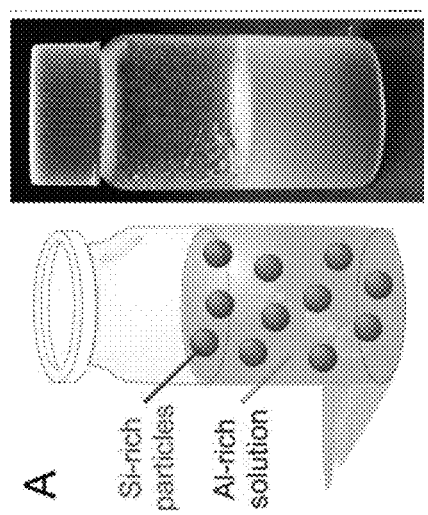
FIG. 8A depicts synthesis solutions employing colloidal silica retain much of the total $SiO_2$ concentration within amorphous particles.

FIG. 8A depicts synthesis solutions employing colloidal silica retain much of the total $SiO_2$ concentration within amorphous particles. FIG. 8B depicts a transmission electron micrograph at low and high (inset) magnification of particles extracted from a solution with a molar ratio of 4.0 $SiO_2$: 1.0 $Al_2O_3$: 11 NaOH: 190 $H_2O$ that was aged at room temperature for 48 hours. LTA formation in "silica-rich" solutions occurs through spatial segregation of reagents into silicon-rich and aluminum-rich regions as shown in FIG. 8A. Synthesis solutions employing colloidal silica (LUDOX®) retain much of the total $SiO_2$ concentration within c.a. 25-nm amorphous particles, while $SiO_2$ in solutions with TEOS is retained within an immiscible organic layer due to a slow rate of hydrolysis, which releases silica to a solution containing c.a. 6-nm aluminum particles. In both cases, nucleation occurs in Al-rich environments that favor the initial formation of LTA zeolite.

Initial Stage of Zeolite Crystallization.

The protocol for sol-gel zeolite synthesis involves the mixing of silica and alumina sources in alkaline aqueous solutions (typically pH 12 to 14). We used colloidal silica (commercial LUDOX®) and sodium aluminate as the starting materials for all zeolites reported in this study. LUDOX® colloidal silica is a mildly basic aqueous solution of suspended silica nanoparticles. Combined XRD, DLS, and TEM analyses revealed that the colloidal suspension is a monodisperse population of amorphous spherical particles of diameter ~25 nm. The addition of LUDOX® colloidal silica to basic solutions of NaOH (pH >13) in the absence of alumina resulted in the temporal dissolution of silica particles. We used dynamic light scattering (DLS) to monitor silica dissolution at room temperature (25° C.), which mimics the condition used to mix reagents and age zeolite growth solutions prior to hydrothermal treatment. Analysis of a solution with molar composition 4.0 SiO2: 11 NaOH: 190 H2O (corresponding to the 3.22 mol/L NaOH ternary diagram in FIG. 7) revealed a linear decrease in the hydrodynamic diameter at a rate of 0.02 ±0.01 nm/min. The linear trend in silica dissolution and the magnitude of the dissolution rate are both consistent with those reported in DLS and small-angle X-ray scattering (SAXS) studies of silicates prepared with tetraethylorthosilicate (TEOS) reagent — notably, the ~4-nm precursors of the all-silica zeolite silicalite-1 (MFI framework type) and amorphous silica particles (~250 nm) prepared by the Stöber method.

To test the effect of reduced water content on the rate of silica dissolution, we performed DLS measurements using a LUDOX® suspension with molar composition 11.5 $SiO_2$: 32 NaOH: 190 $H_2O$, which corresponds to the 9.36 mol/L NaOH ternary diagram in FIG. 7. Here we keep the Si/OH ratio fixed as before, but increase the concentrations of silica and hydroxide by lowering the water content. Past studies have reported that amorphous silica dissolution in basic solutions exhibits a sigmoidal relationship between the rate of dissolution and pH wherein the rate is constant above pH 10. Greenberg found that above pH 11, the rate of amorphous silica dissolution is independent of hydroxyl ion concentration and proportional to the concentration of silica introduced into the solution at fixed pH. Indeed, we found that both samples—the 11 NaOH:190 $H_2O$ solution with 1.2 mol/L $SiO_2$ and the 32 NaOH:190 $H_2O$ solution with 3.4 mol/L $SiO_2$—have equal pH (~13.6 within the resolution of the pH meter). DLS measurements of LUDOX® dissolution at higher silica concentration revealed a rate of 0.07±0.03 nm/min, which is nearly 3-times larger than the rate of dissolution at lower silica concentration (see FIG. 22A and FIG. 22B). The difference in rate is consistent with a first-order rate expression for amorphous silica dissolution proposed by Greenberg. Interestingly, these results suggest that water content, and not alkalinity, is more influential for silica dissolution at the early stages of zeolite crystallization since growth solutions are typically above pH 11 (for a full list of pH values at each growth condition see Tables III to IX). It is important to mention that these effects may be influenced by alkali concentration since the change in $Na^+$ is commensurate with changes in sodium aluminate ($Na_2OAl_2O_3$) and NaOH reagents used to achieve a desired growth composition (here we have not explicitly assessed the role of $Na^+$). It is also important to emphasize that a comparison of two or more zeolite syntheses using the Si—Al—NaOH ternary diagram must account for water content as a separate parameter. Using water content as an additional parameter, we showed a dramatic shift in phase behavior (FIG. 7) wherein the LTA-FAU diagrams at higher water content shift to EMT-SOD at lower water content. Although our experiments cannot fully rationalize these differences in phase behavior, it is reasonable to suggest that these changes may be due to more rapid release of silica from the colloidal silica particles at lower water content. This may also explain why EMT seemingly only forms at lower water content instead of LTA and FAU, which have similar molar volumes (i.e., the thermodynamic stability of all three structures is similar, suggesting the initial zeolite framework type is determined almost entirely by kinetics). Likewise, the slow rate of LUDOX® dissolution at high water content can explain the LTA-to-FAU transition previously noted in our discussion of FIG. 5. Herein we elaborate on this observation.

Figure 9:
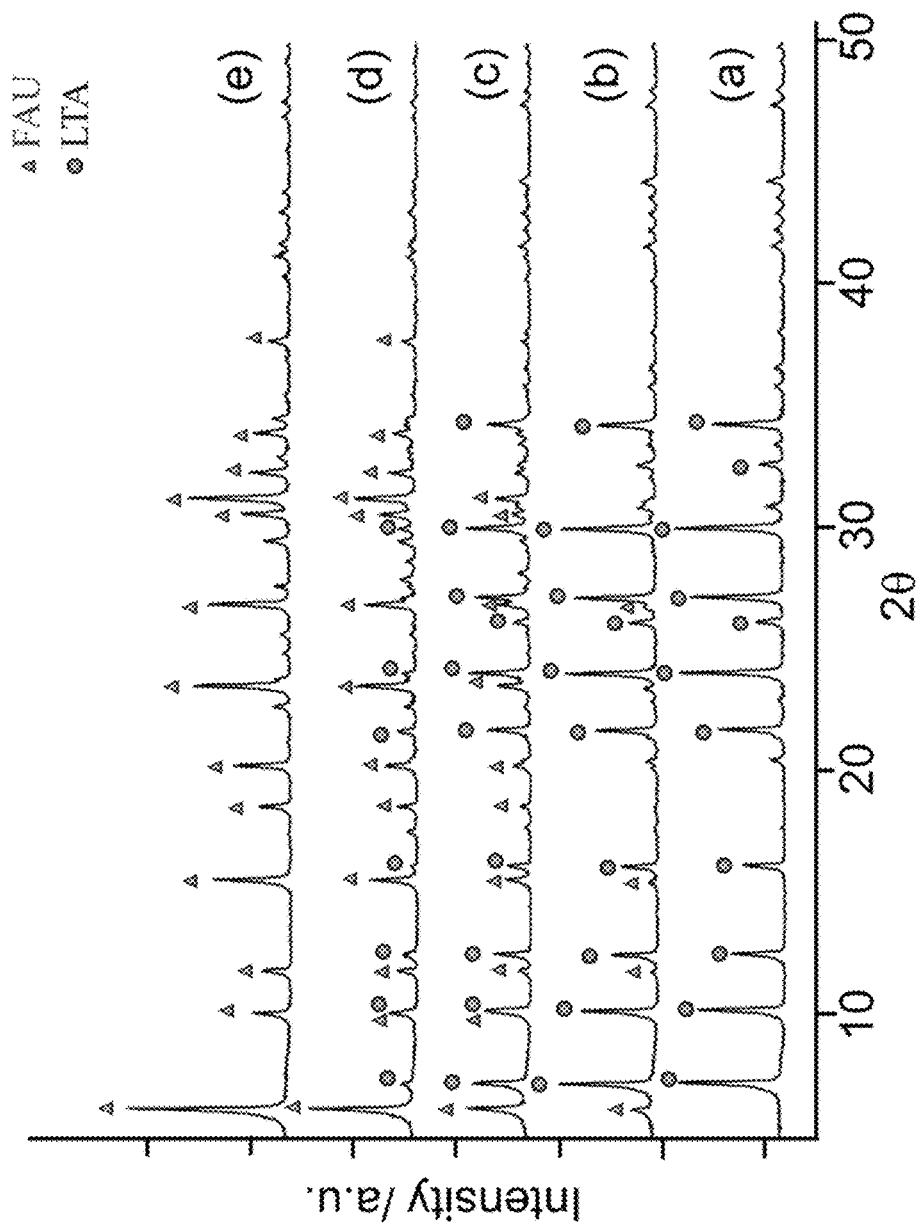
FIG. 9 depicts XRD patterns of samples heated at 65° C. for seven days with a molar composition of 6 NaOH: 190 $H_2O$.

Several samples tested within the Si-rich, pure FAU region of the ternary phase diagram (FIG. 1A) formed LTA as the first structure, which then transformed to FAU within hours. This phase transformation was examined at periodic the timescales of these transitions, we analyzed by XRD the solids extracted from a zeolite growth solution heated at 65° C. for various times during the synthesis (FIG. 9). To this end, we selected a solution composition with SAR(liq)=2 that lies within the pure FAU phase region of FIG. 1A. The growth solution was divided equally in four separate autoclaves, which were heated at 65° C. for different times. The initial amorphous material (prior to heating) showed the onset of Bragg peaks (indexed as LTA) within 6 hours of heating. After 12 hours of heating, a mixture of zeolites LTA and FAU were observed. Within 24 hours, the XRD pattern indicated pure FAU and remained the same for 7 days of heating.

We also examined the colloidal stability of LUDOX® particles in the presence of alumina. It has been shown that alumina reduces the rate of amorphous silica dissolution and promotes the aggregation of silica particles. Preliminary studies suggest that alumina inhibits silica dissolution due to the formation of an alumina layer on the exterior surface of the spherical silica particles. To test the temporal evolution of silica nanoparticles in the presence of alumina, we introduced sodium aluminate to the same solution studied above (4.0 $SiO_2$: 1.0 $Al_2O_3$ molar ratio). This solution was aged at 25° C. for 48 hours and was then analyzed by transmission electron microscopy (TEM).

The amorphous particles in Na-zeolite synthesis are often referred to as gels within the context of early definitions that describe the "gel" as a hydrous metal aluminosilicate with the generic composition $Na_a(AlO_2)_b(SiO_2)_c.NaOH.H_2O$. These gels are postulated to form via a condensation-polymerization mechanism between silicate and aluminate species. This definition of gel, however, can be easily misinterpreted with the more common description of zeolite growth solutions as a sol gel, which by the strict colloidal definition is a solid phase dispersed within a continuous liquid phase. That these particles are a hydrated network of alumina and silica. This is clearly not the case for the solutions examined in this study where colloidal silica forms a suspension in an aluminum-rich solution, which solution is a heterogeneous mixture of Si-rich particles and Al-rich solution. This may explain why the first phase that forms is LTA, which is the preferred phase in Al rich solutions that evolves An interesting important implication of this study is, which can change the initial composition of the zeolite growth solution.

As previously discussed, FIG. 7 depicts ternary phase diagrams for Na-zeolite synthesis at 65° C., which are constructed vertically in a fourth dimension corresponding to water content. LTA formation in "silica-rich" solutions occurs through spatial segregation of reagents into silicon-rich and aluminum-rich regions (A). Synthesis solutions employing colloidal silica retain much of the total SiO2 concentration within amorphous particles (ca. 25-nm LUDOX® reagent). (B) TEM image at low and high (inset) magnification of particles extracted from a solution with molar ratio 4.0 SiO2:1.0 $Al_2O_3$: 11 NaOH: 190 $H_2O$ that was aged at room temperature for 48 hours. Micrographs reveal that solutions contain spheroidal particles with sizes slightly larger than the LUDOX® reagent. (C) Power XRD patterns of solids extracted from a 65° C. at periodic times revealed the onset of LTA crystallization after 6 hours followed by the complete phase transformation to FAU within 24 hours.

We have shown that the construction of phase diagrams for organic-free syntheses of Na-zeolites requires careful consideration of six parameters, although the dimensions of phase space can be reduced to five if either time or temperature is held fixed. Many trends in zeolite synthesis reported by other groups confirm those presented here. These studies have provided valuable insight into the nature of phase transformations. Most of these studies, however, have focused on one or two parameters to assess a limited range of phase space, rather than a more rigorous analysis of all six parameters. The uniqueness of our approach is the establishment of a generalized framework for understanding phase transitions that will permit more rational design of synthesis conditions to avoid polymorph formation. Further studies may also prove useful for expanding the compositional space (i.e., SAR values) of framework structures. This current study draws inspiration from the pioneering work of Breck, Flanigen, and others who formulated empirical observations of zeolite phase transformation using Si—Al—Na₂O ternary diagrams. Our studies suggest that kinetic phase diagrams are a generalized platform to tailor zeolite growth conditions; however, the phase space examined in this study only accounts for a fraction of zeolite structures that can be synthesized in organic-free media. Indeed, kinetic phase diagrams presented here can be expanded in future studies to explore the influence of non-framework alkali metals or different alkalinity, which can either be adjusted by changing the water content or holding the latter fixed while adjusting the Si/OH mole ratio in the ternary diagram. Notably, past studies reveal additional As such, it is reasonable to expect to values greater than unity.

Materials and Zeolite Crystallization.

Tetraethylorthosilicate (TEOS, 98%), LUDOX® AS-40 colloidal silica (40%), sodium hydroxide (98%), were purchased from SIGMA-ALDRICH®. Sodium aluminate was purchased from ALFA AESAR®. All reagents were used as received without further purification. All solutions were prepared using deionized water (18.2 M Ω) purified with an Aqua Solutions™Inc. purification system (Model: RODI-C-12A).

Zeolites were prepared by adding sodium aluminate and sodium hydroxide to deionized water (~10 mL). After stirring until the solution was homogenous, LUDOX® AS-40 colloidal silica was added and the solution was stirred for an additional 24 hours. The homogeneous mixture was transferred to a TEFLON® liner, which was capped and placed in a stainless steel autoclave. The autoclave was placed in the oven for a desired period of time. Upon removal from the oven, the autoclave was cooled to ~25° C. in a water bath for 1 hour prior to filtration and analysis. The crystal structure information for zeolites synthesized in this study is provided below (data were obtained from the International Zeolite Association).

Faujasite (FAU): The crystal framework structure of FAU (a.k.a. zeolite X, Y or USY) has the space group Fd-3m ($\alpha=\beta=\gamma=90°$) with a 3D pore network of 12-MR pore diameter.

Linde-Type (LTA): The crystal framework structure of LTA (a.k.a. zeolite A) has the space group Pm-3m ($\alpha=\beta=\gamma=90°$) with a 3D pore network of 8-MR pore diameter.

Sodalite (SOD): The crystal framework structure of SOD has the space group Im-3m ($\alpha=\beta=\gamma=90°$) with a 0-dimensional pore network.

Gismondine (GIS): The crystal framework structure of GIS (a.k.a. zeolite P) has the space group 141/amd ($\alpha=\beta=\gamma=90°$) with a 3D pore network of 8-MR pore diameter.

Cancrinite (CAN): The crystal framework structure of CAN has the space group P63/mmc ($\alpha=\beta=90°, \gamma=120°$) with a 1D pore network of 12-MR pore diameter.

Analcime (ANA): The crystal framework structure of ANA has the space group Ia-3d ($\alpha=\beta=\gamma=90°$) with a volume of 2.49719 nm3 and a 3D pore network of 8-MR pore diameter.

EMT-Type (EMT): The crystal framework structure of EMT (a.k.a. EMC-2) has the space group P63/mmc ($\alpha=6=90°, \gamma=120°$) with a 3D pore network of 12-MR pore diameter. The synthesis conditions (molar composition, Si/Al molar ratio, solution pH, temperature, and heating time) and resulting crystal phase(s) for all samples prepared in this study are listed in the tables.

Characterization.

Zeolite samples were characterized by powder X-ray diffraction (XRD), scanning electron microscopy (SEM), energy dispersive X-ray (EDX) spectroscopy, and transmission electron microscopy (TEM). XRD patterns were collected on a Siemens D5000 X-ray diffractometer using CuK$\alpha$ radiation (40 kV, 30 mA). DLS measurements were conducted using a Brookhaven Instruments BI-200SM machine equipped with a TurboCorr Digital Correlator and a HeNe laser diode (35 mW, 637 nm). SEM microscopy was conducted with a FEI-235 Dual-Beam Focused Ion Beam microscope. EDX spectroscopy was conducted with a JEOL JSM 6330F Field Emission scanning electron microscope. TEM and EDX were performed at the Microscopy and Imaging Center (Texas A&M University) using a FEI TEC-NAI G2 F20 FE-TEM instrument.

Analysis of Crystal Structures in their Kinetic Phase Diagrams.

Figure 10:
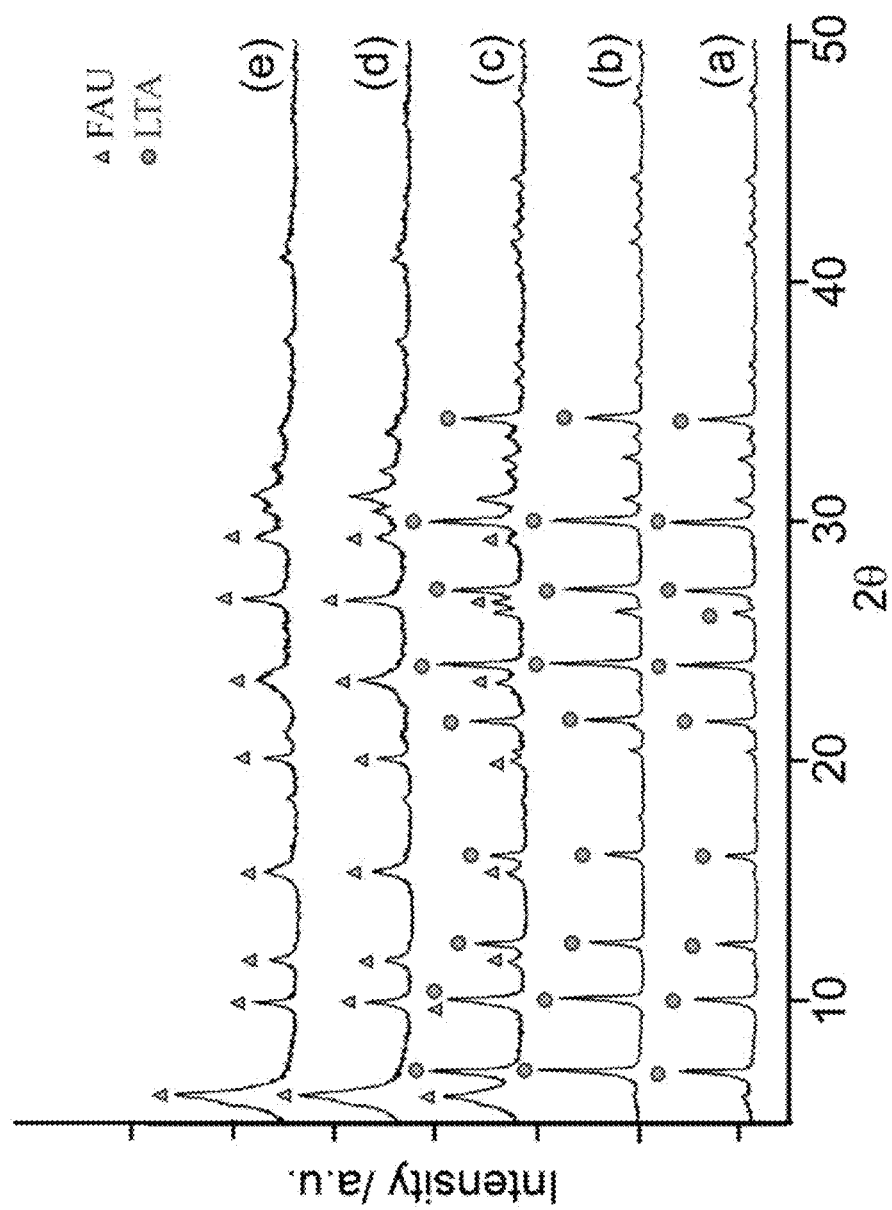
FIG. 10 depicts XRD patterns of samples heated at 65° C. for seven days with a molar composition of 11 NaOH: 190 $H_2O$.
Figure 11:
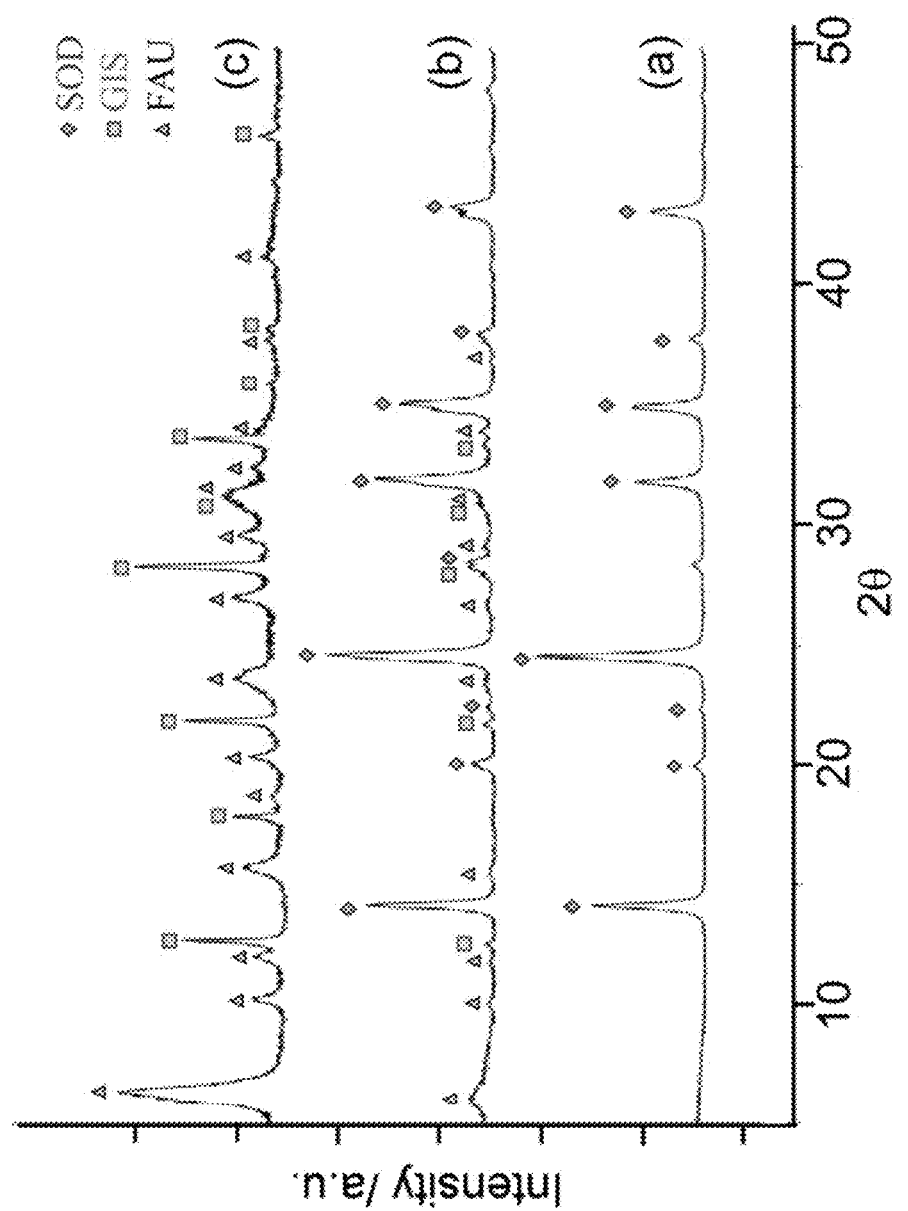
FIG. 11 depicts XRD patterns of samples heated at 65° C. for seven days with a molar composition of 32 NaOH: 190 $H_2O$.

Systematic studies of zeolite crystallization were performed at 65° C. for 7 days using synthesis solutions with molar composition X $SiO_2$:Y $Al_2O_3$:Z NaOH: 190 $H_2O$ (where Z=6, 11, and 32). FIG. 9, FIG. 10, and FIG. 11 contain XRD patterns of zeolite crystals prepared in single phase and multiphase regions of the kinetic phase diagrams. The silicon-to-aluminum ratio of synthesis solutions (labeled as SAR(liq)) and corresponding $SiO_2$:$Al_2O_3$ molar ratios are provided for each sample.

FIG. 9 depicts XRD patterns of samples heated at 65 degrees Celsius for seven days with a molar composition of 6 NaOH: 190 H2O. The crystalline product(s) and corresponding SAR(liq) value for each sample are as follows: (a) pure LTA, 4$SiO_2$:2.25$Al_2O_3$ (SAR(liq)=0.89); (b) mixture of FAU (minor component) and LTA (major component), 2.0$SiO_2$:1.0$Al_2O_3$ (SAR(liq)=1.0); (c) mixture of FAU and LTA, 3.0$SiO_2$:1.0$Al_2O_3$ (SAR(liq)=1.5); (d) mixture of FAU (major component) and LTA (minor component), $4.0SiO_2$: $1.0Al_2O_3$ (SAR(liq)=2); (e) pure FAU, $4.0SiO_2$:$0.5Al_2O_3$ (SAR(liq)=4.0).

FIG. 10 depicts XRD patterns of samples heated at 65 degrees Celsius for seven days with a molar composition of 11 NaOH: 190 $H_2O$. The crystalline product(s) and corresponding SAR(liq) value for each sample are as follows: (a) LTA (trace FAU), $1.0SiO_2$:$1.0Al_2O_3$ (SAR(liq)=0.5); (b) pure LTA, $2.0SiO_2$:$1.0Al_2O_3$ (SAR(liq)=1.0); (c) mixture of FAU and LTA, $2.5SiO_2$:$1.0Al_2O_3$ (SAR(liq)=1.25); (d) pure FAU, $3.0SiO_2$:$1.0Al_2O_3$ (SAR(liq)=1.5); (e) pure FAU, $4.0SiO_2$:$1.0Al_2O_3$ (SAR(liq)=2.0).

FIG. 11 depicts XRD patterns of samples heated at 65 degrees Celsius for seven days with a molar composition of 32 NaOH: 190 $H_2O$. XRD patterns of samples heated at 65° C. for 7 days with molar composition 32 NaOH: 190 $H_2O$ and the following SAR(liq) values and crystal structure(s): (a) pure SOD, 11.1 $SiO_2$: 3.7 $Al_2O_3$ (SAR(liq)=1.5); (b) SOD (major component), FAU (minor component), GIS (minor component), 15.8 $SiO_2$: 2.6 $Al_2O_3$ (SAR(liq)=3.1); (c) mixture of GIS and FAU, 25.6 $SiO_2$: 2.6 $Al_2O_3$ (SAR(liq)=5).

Figure 12:
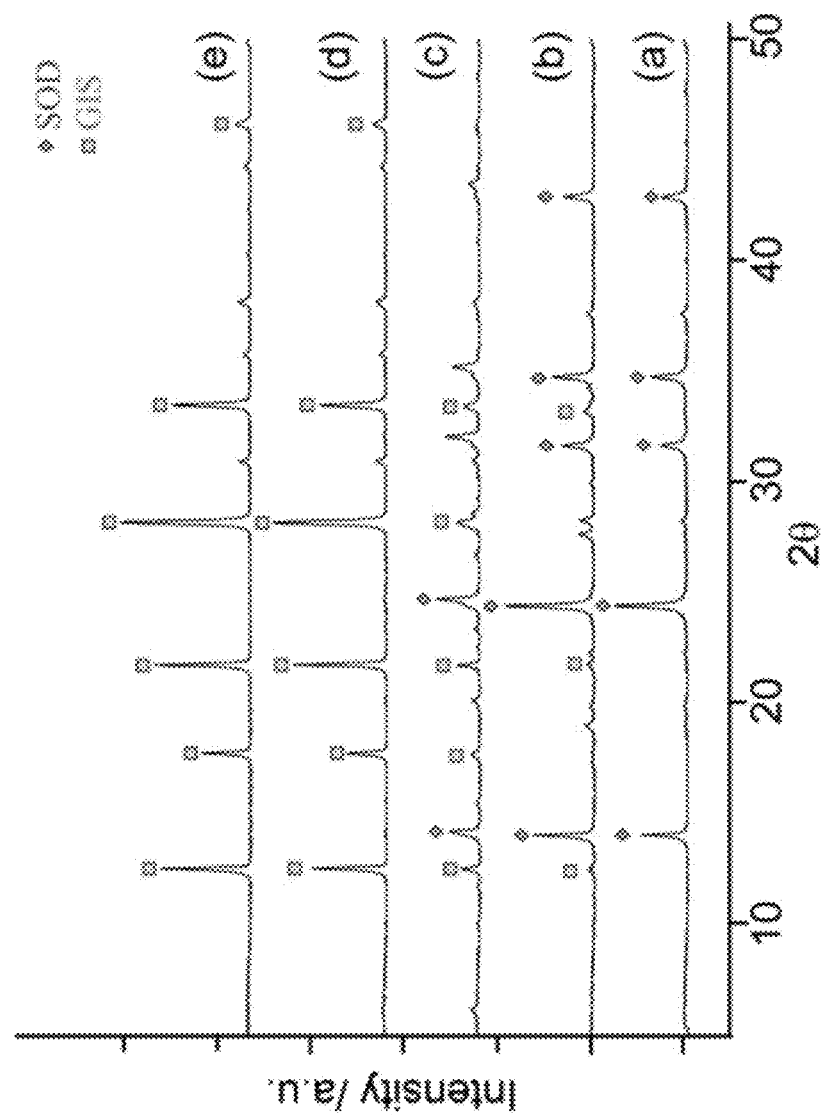
FIG. 12 depicts XRD patterns of samples heated at 100° C. for seven days with a molar composition of 11 NaOH: 190 $H_2O$.
Figure 13:
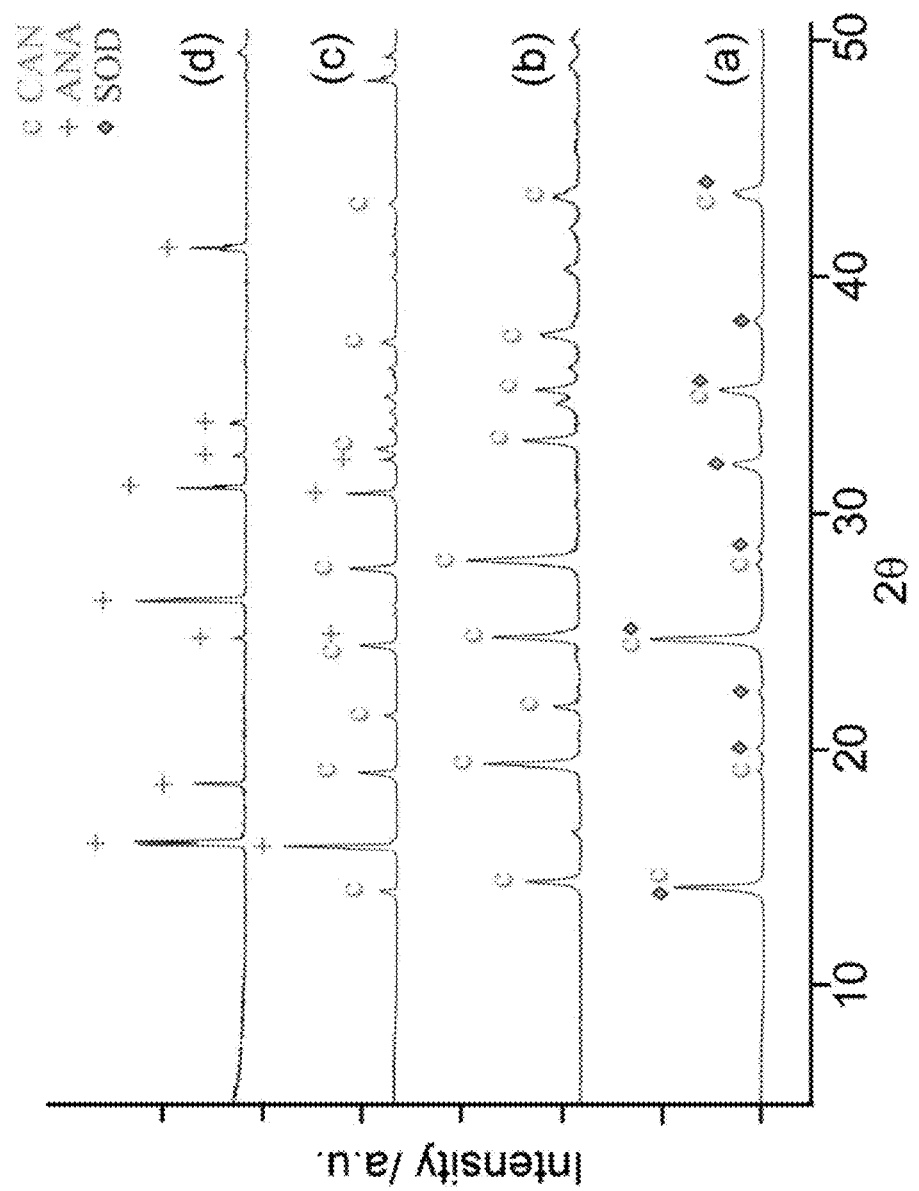
FIG. 13 depicts XRD patterns of samples heated at 180° C. for twenty-one days with a molar composition of 11 NaOH: 190 $H_2O$.
Figure 14:
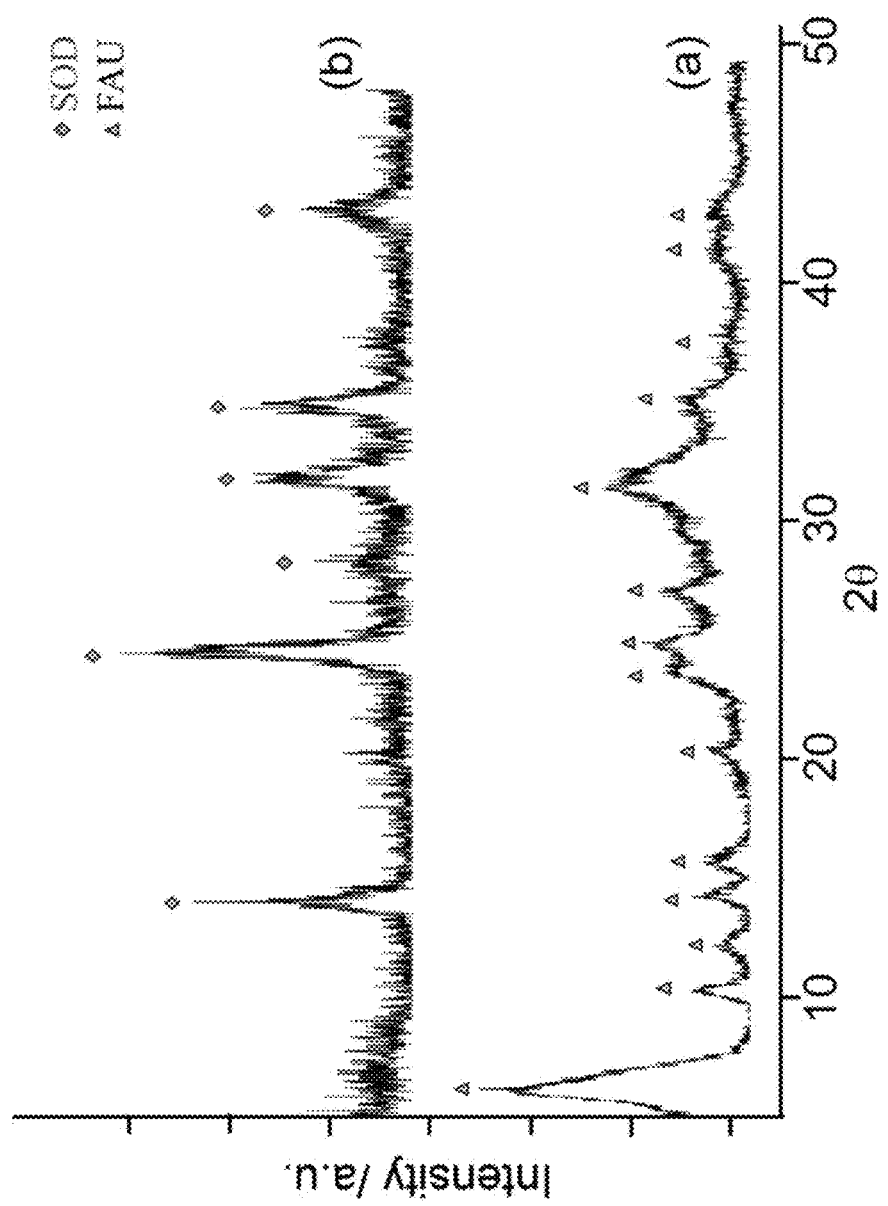
FIG. 14 depicts XRD patterns of solid extracted from growth solutions with molar compositions of 4.5 $SiO_2$: 0.9 $Al_2O_3$: 32 NaOH: 190 $H_2O$ ($SAR_{(liq)}$=5) that were heated at 65 degrees Celsius for (a) two hours and (b) six hours.

Zeolite crystallization was performed at higher temperature (100, 120, and 180° C.) with synthesis solutions of molar composition X $SiO_2$:Y $Al_2O_3$:11 NaOH: 190 $H_2O$. FIG. 12, FIG. 13 and FIG. 14 contain XRD patterns of zeolites prepared in single phase and multiphase regions of these kinetic phase diagrams.

FIG. 12 depicts XRD patterns of samples heated at 100 degrees Celsius for seven days with a molar composition of 11 NaOH: 190 H2O. The crystalline product(s) and corresponding SAR(liq) value for each sample are as follows: (a) pure SOD, $1.0SiO_2$:$2.0Al_2O_3$ (SAR(liq)=0.5); (b) mixture of GIS (trace component) and SOD (major component), $2.0SiO_2$:$1.0Al_2O_3$ (SAR(liq)=1.0); (c) mixture of GIS (minor component) and SOD (major component), FAU (trace component, see FIG. 11) $3.0SiO_2$:$1.0Al_2O_3$ (SAR(liq)=1.5); (d) mixture of GIS (major component) and SOD (trace component), $4.0SiO_2$:$1.0Al_2O_3$ (SAR(liq)=2.0); (e) pure GIS, $5.0SiO_2$:$1.0Al_2O_3$ (SAR(liq)=2.5).

FIG. 13 depicts XRD patterns of samples heated at 180 degrees Celsius for twenty-one days with a molar composition of 11 NaOH: 190 $H_2O$. The crystalline product(s) and corresponding SAR(liq) value for each sample are as follows: (a) pure CAN, $4.0SiO_2$:$1.0Al_2O_3$ (SAR(liq)=2.0); (b) mixture of CAN (major component) and ANA (proposed minor component), $4.0SiO_2$:$0.6Al_2O_3$ (SAR(liq)=3.3); (c) mixture of CAN (major component) and ANA (proposed minor component), $4.1SiO_2$:$0.7Al_2O_3$ (SAR(liq)=5.8); (d) pure ANA, $4.1SiO_2$:$0.3Al_2O_3$ (SAR(liq)=13.7).

XRD Analysis of Time-Elapsed Crystallization Studies

We characterized zeolite crystallization at short timeframes (0 to 24 hours) by XRD to identify the initial crystal structures and their transformations over a range of temperatures using synthesis solutions with molar compositions X $SiO_2$: Y $Al_2O_3$: Z NaOH : 190 $H_2O$ (where Z=6, 11, and 32). The following figures contain powder XRD patterns of samples within various regions of the kinetic phase diagrams. The molar composition used in FIG. 14 yields pure SOD crystals with 7 days of heating (see the kinetic phase diagram in FIG. 1B). Mintova et al. report that EMT-type zeolite forms within 24 hours of low temperature heating (30° C.) at this exact composition. Here we observed that higher temperatures (30 to 65° C.) result in the initial formation of EMT, although the resolution of the XRD instrument used to measured powder spectra cannot resolve whether the structure is EMT or FAU. Longer heating times resulted in the phase transformation to SOD. These studies reveal that synthesis solutions with higher hydroxide concentrations (32 NaOH:190 $H_2O$) bypass the initial formation of LTA, as was observed in the kinetic phase diagrams at higher water content. For instance, similar synthesis conditions using a molar ratio 11 NaOH:190 $H_2O$ (see FIG. 15) revealed that LTA and FAU crystal structures formed at short and long heating times, respectively.

FIG. 14 depicts XRD patterns of solid extracted from growth solutions with molar composition 4.5 $SiO_2$: 0.9 $Al_2O_3$: 32 NaOH: 190 $H_2O$ (SAR(liq)=5) that were heated at 65° C. for (a) 2 and (b) 6 hours. Broad peaks suggest small crystal size, and due to nanocrystal formation it is difficult to distinguish between FAU and EMT without higher resolution. (Mintova Science 2012) Peaks in (a) are indexed as FAU for clarity but it is unclear if the phase is FAU, EMT, or a mixture thereof.

Figure 15:
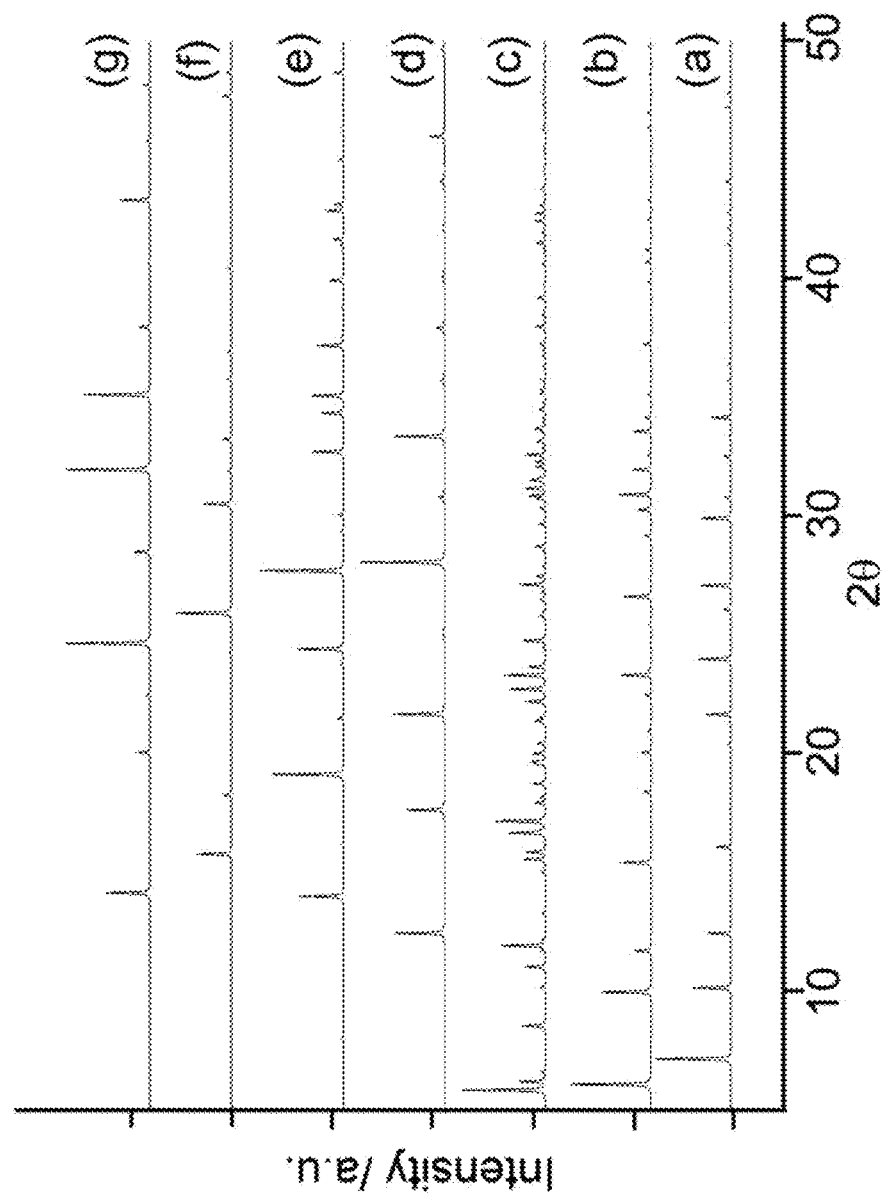
FIG. 15 depicts simulated powder XRD patterns obtained from the International Zeolite Association Structure Database used to index zeolite crystal structures.

FIG. 15 depicts simulated powder XRD patterns used to index zeolite crystal structures. These spectra were obtained from the International Zeolite Association Structure Database for the following crystal structures: (a) LTA, Linde type A dehydrated; (b) FAU, Na—X dehydrated; (c) EMT, EMC-2 partially dehydrated; (d) GIS, Na—P1; (e) CAN, Cancrinite; (f) ANA, Analcime; and (g) SOD, Sodalite octahydrate. Peak intensities were increased for both FAU and EMT for 2θ≥8° for enhanced clarity.

Crystal Impurities in the Binary GIS-SOD Phase Regions

FIG. 16 depicts XRD patterns of samples synthesized for 7 days at 100 and 120° C. using a molar composition 3 $SiO_2$: 1 $Al_2O_3$ (SAR(liq)=1.5). These conditions produced a mixture of GIS and SOD crystals with a third crystal phase: FAU crystals at 100° C. and CAN crystals at 120° C.

Figure 17:
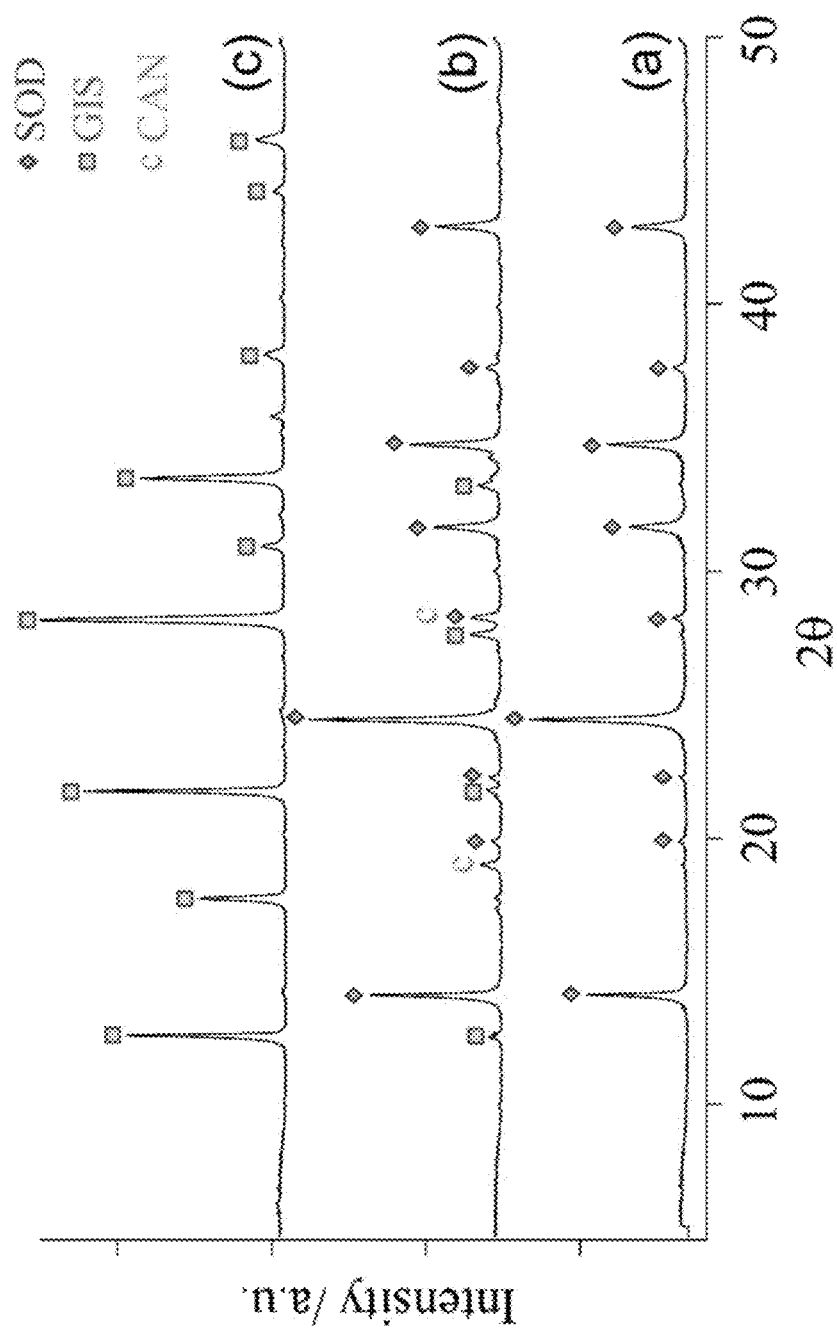
FIG. 17 depicts powder XRD patterns of seven day syntheses at 100° C. for $SAR_{(liq)}$ values of (a) 0.5, (b) 1.0, and (c) 2.0.

FIG. 17 depicts powder XRD patterns of 7 day syntheses at 100° C. for SAR(liq) values of (a) 0.5, (b) 1.0, and (c) 2.0. These analyses clearly show a transition from SOD crystals in Al-rich solution to GIS crystals in Si-rich solutions. At intermediate SAR(liq) values (b) there is a mixture of SOD and GIS crystals with what appears to be a trace quantity of CAN crystals.

Kinetic Phase Diagrams.

Figure 18:
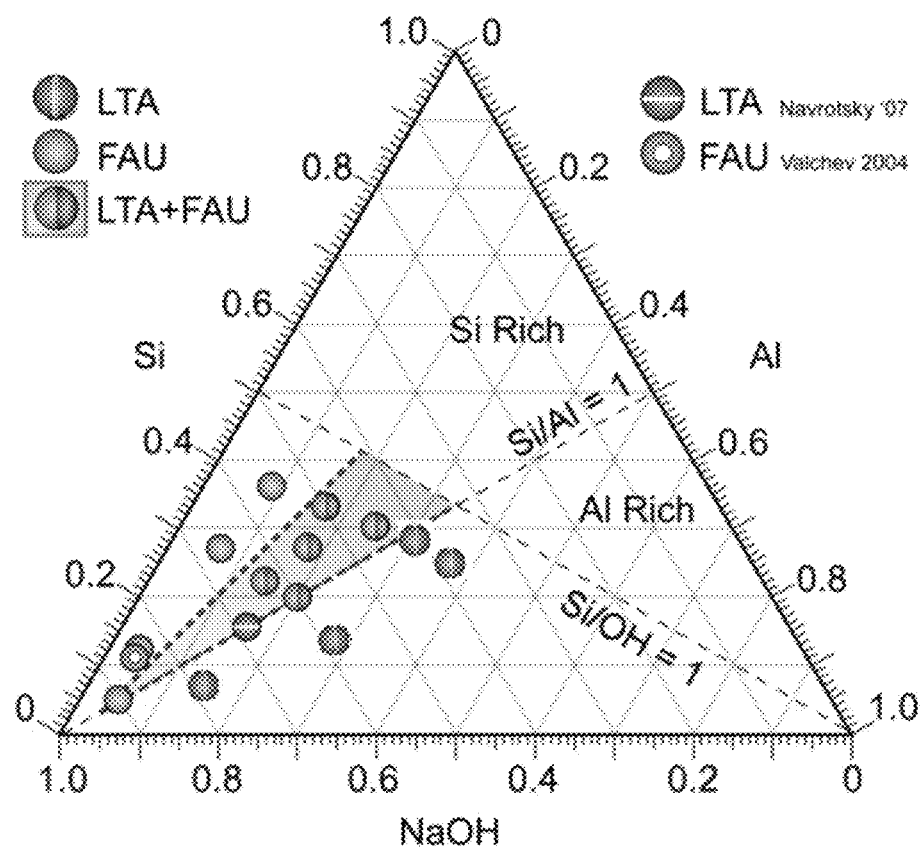
FIG. 18 depicts a kinetic phase diagram of LTA-FAU syntheses using solutions of molar compositions X $SiO_2$:Y $Al_2O_3$: 6 NaOH: 190 $H_2O$ that were heated at 65° C. for one week.

FIG. 18 depicts a kinetic phase diagram of LTA-FAU syntheses using solutions of molar compositions X $SiO_2$: Y $Al_2O_3$: 6 NaOH: 190 $H_2O$ that were heated at 65 degrees Celsius for one week.

Figure 19:
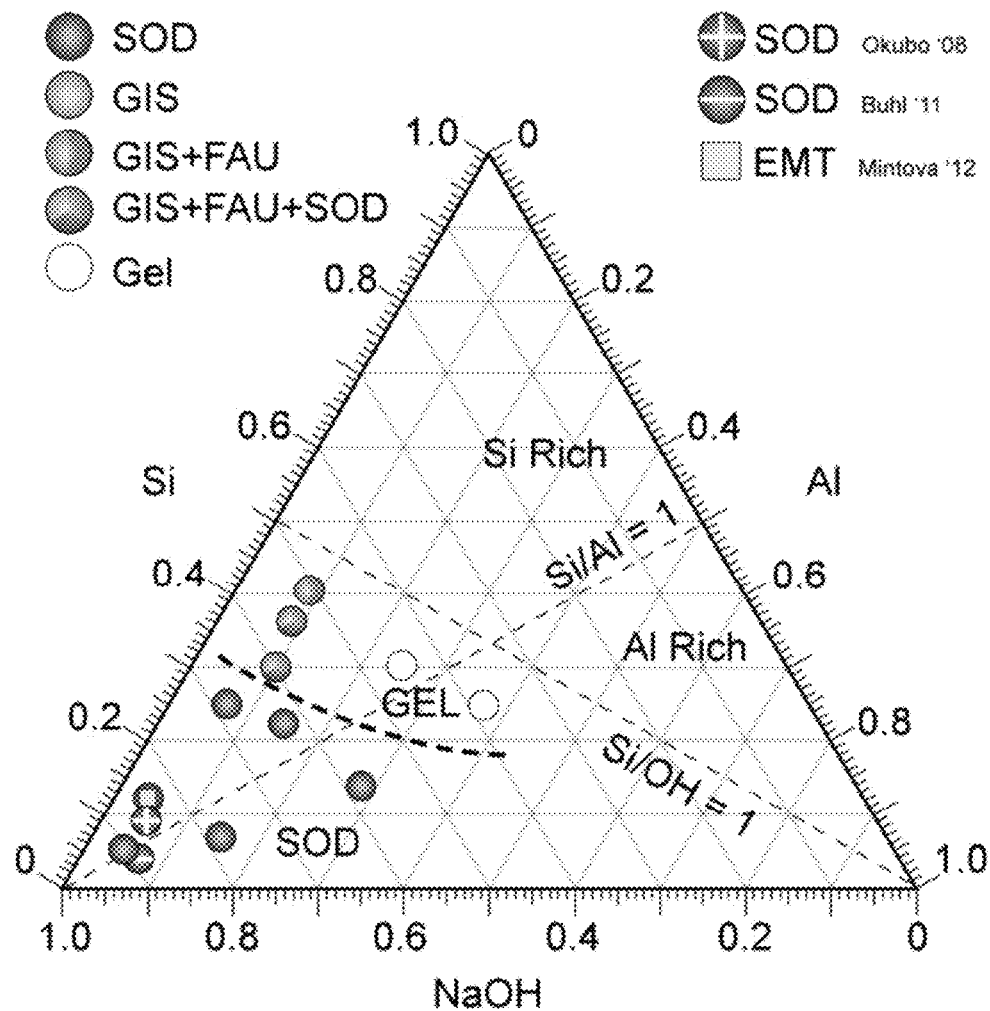
FIG. 19 depicts a kinetic phase diagram of GIS-FAU-SOD syntheses using solutions of molar compositions X $SiO_2$:Y $Al_2O_3$: 32 NaOH: 190 $H_2O$ that were heated at 65° C. for one week.

FIG. 19 depicts a kinetic phase diagram of LTA-FAU syntheses using solutions of molar compositions X $SiO_2$: Y $Al_2O_3$: 32 NaOH: 190 $H_2O$ that were heated at 65° C. for 1 week. The dashed line represents the approximate boundary for gelation (c.a. Si/OH>0.4). Open white circles represent highly viscous growth solutions that were not tested beyond the initial mixing stage. Other samples in the gelation region were heated for 1 week and resulted in multiphase products containing SOD, GIS, and FAU crystals.

Scanning and Transmission Electron Microscopy

FIGS. 20A-20F depict representative scanning electron micrographs of FAU, LTA, GIS, SOD, ANA, and CAN crystals. Zeolite A (LTA) crystals possess a cubic morphology with a size on the order of 1 μm. Faujasite (FAU) crystals are small nanoparticles (10 to 150 nm) that appear to form larger aggregates with an average size of 500 nm. Sodalite (SOD) crystals do not possess a well-defined crystal habit, but appear to be condensed solids of arbitrary shape (possibly aggregates of spheroidal crystals). Zeolite P (GIS) crystals form large, polycrystalline aggregates with by pyramidal morphology and sizes ranging from 2 to 10 μm. Analcime (ANA) crystals form smooth polyhedral particles with dimensions of 50 µm or larger. The polyhedral crystals appear to be fused together (possibly the formation of crystal intergrowths).

Scanning electron micrographs of zeolite crystals with framework types (FIG. 20A) FAU, (FIG. 20B) GIS, and (FIG. 20C) ANA formed in Si-rich solutions and types (FIG. 20D) LTA, (FIG. 20E) SOD, and (FIG. 20F) CAN formed in Al-rich solutions. Zeolite crystals were prepared from growth solutions with molar composition X $SiO_2$:Y $Al_2O_3$: 11 NaOH: 190 $H_2O$. FAU and LTA crystals were prepared by a 7-day synthesis at 65° C. using (FIG. 20A) SAR(liq)= 0.5 (X=1, Y=1) and (FIG. 20D) SAR(liq)=2.5 (X=5, Y=1). GIS and SOD crystals were prepared by a 7-day synthesis at 100° C. using (FIG. 20B) SAR(liq)=2.5 (X=5, Y=1) and (FIG. 20E) SAR(liq)=0.5 (X=1, Y=1). ANA and CAN crystals were prepared by a 21-day synthesis at 180° C. using (FIG. 20C) SAR(liq)=13.7 (X=4.1, Y=0.15) and (F) SAR(liq)=1 (X=2, Y=1). Insets contain higher magnification images of the most representative morphologies observed in the entire crystal population.

Figure 21:
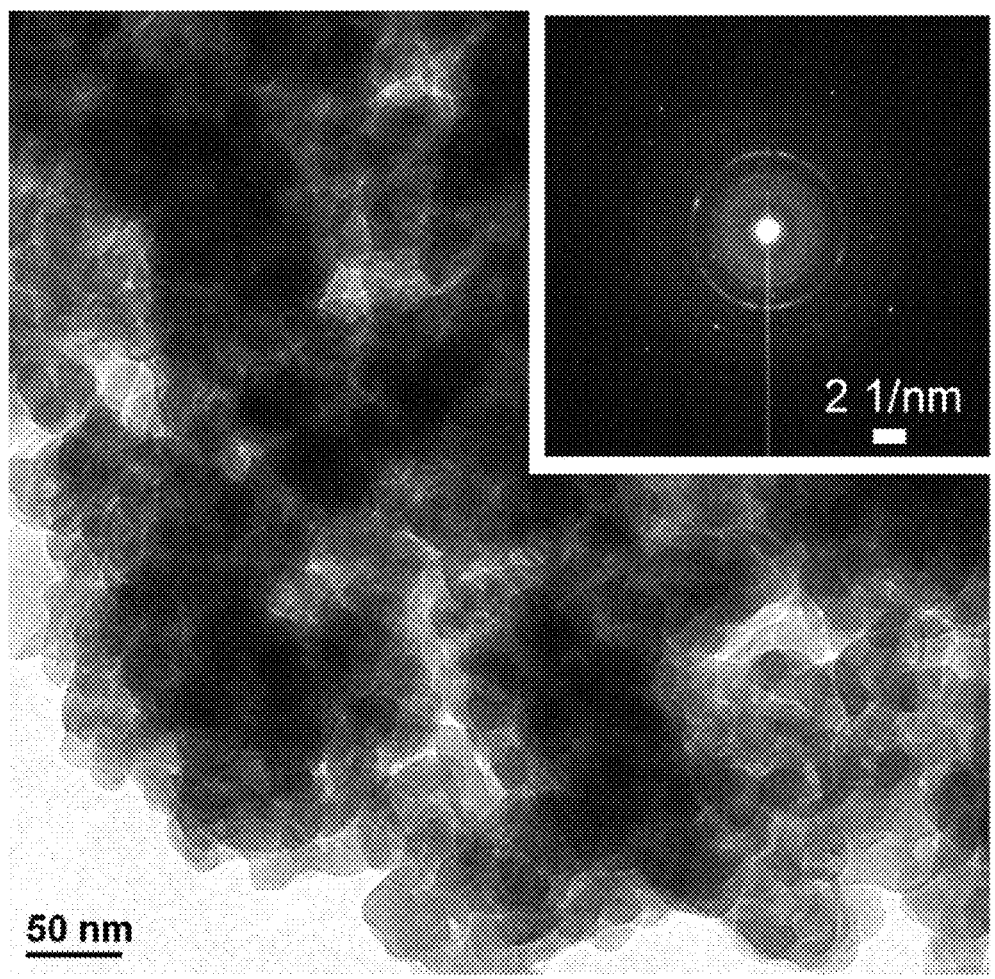
FIG. 21 depicts a transmission electron micrograph of particles extracted from a zeolite growth solution that was heated for six hours at 65° C.

FIG. 21 depicts a transmission electron micrograph of particles extracted from a zeolite growth solution that was heated for 6 hours at 65° C. The solution composition selected for this study had a molar composition of 4.0 $SiO_2$: 1.0 $Al_2O_3$: 11 NaOH: 190 $H_2O$. (Inset) The selected area electron diffraction (SAED) pattern reveals the presence of faint Bragg peaks, suggesting the presence of crystalline material. This is qualitatively consistent with XRD powder patterns of this sample, which showed the presence of LTA crystals (see FIG. 9).

Dynamic Light Scattering

Figure 22A:
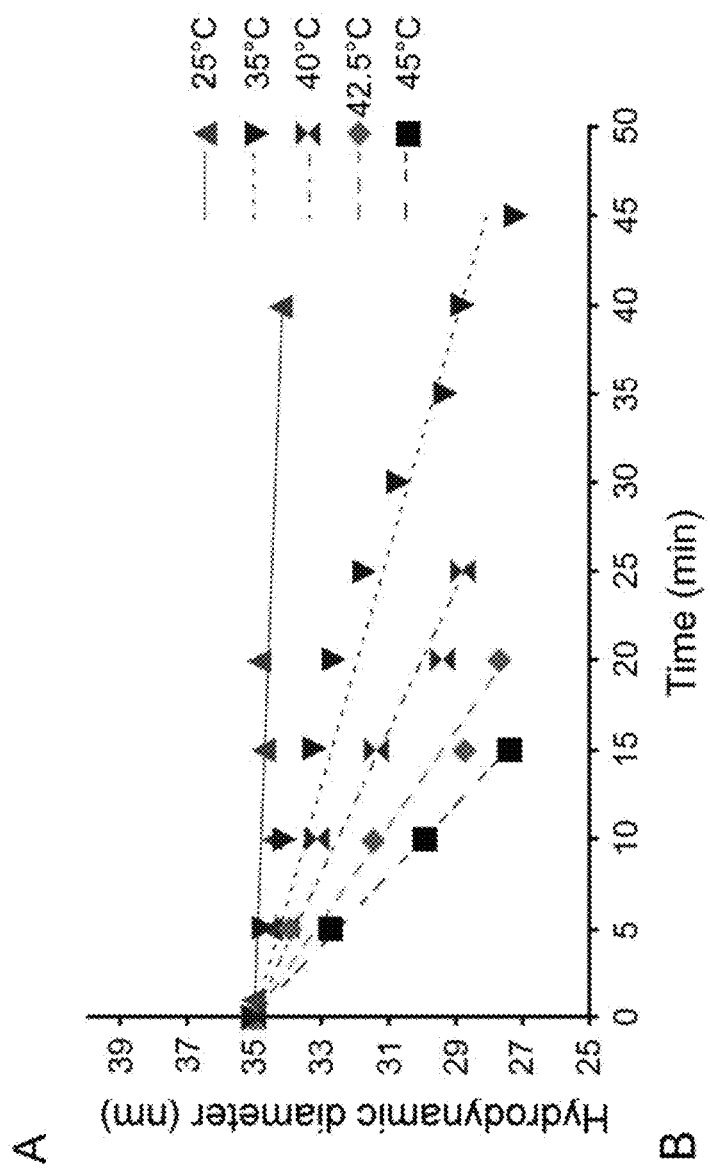
FIG. 22A depicts temporal changes in the hydrodynamic diameter of colloidal silicon particles determined using dynamic light scattering (DLS) measurements of solutions with molar composition 4 $SiO_2$: 11 NaOH: 190 $H_2O$ aged at various temperatures.
Figure 22B:
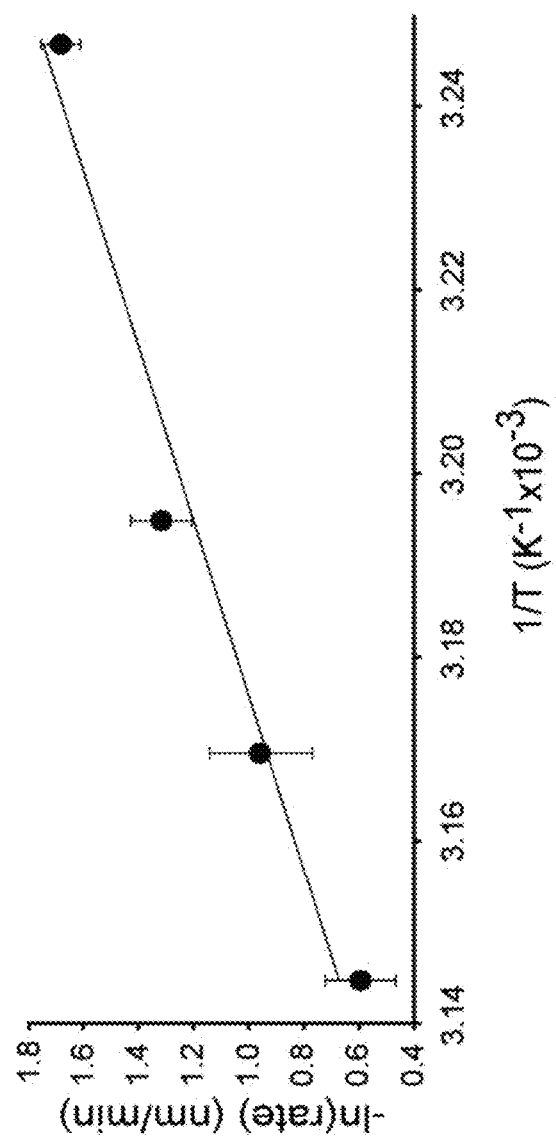
FIG. 22B depicts an Arrhenius plot of the dissolution curves depicted in FIG. 22A.

FIG. 22A depicts temporal changes in the hydrodynamic diameter of colloidal silicon particles determined using dynamic light scattering (DLS) measurements of solutions with molar composition 4 $SiO_2$: 11 NaOH: 190 $H_2O$ aged at various temperatures. FIG. 22B depicts an Arrhenius plot of the dissolution curves depicted in FIG. 22A. Ex situ dynamic light scattering (DLS) measurements of solutions with molar composition 4 $SiO_2$: 11 NaOH: 190 $H_2O$ aged at various temperatures. (FIG. 22A) Temporal changes in the hydrodynamic diameter of LUDOX® colloidal silica particles suspended in Al-free zeolite growth solutions reveal particle dissolution. The rates of dissolution increase with increasing temperature as shown in Table XIV. (B) An Arrhenius plot of the dissolution curves in (A) reveal a linear trend with an apparent activation energy of 87.14 kJ/mole. Data points (symbols) are the average of 3 separate measurements. Error bars equal two standard deviations and solid lines are linear regression.

While the foregoing is directed to implementations of the invention, those of ordinary skill in the art will recognize that other and further implementations of the invention may be devised without departing from the basic scope thereof.

The invention claimed is:

1. A method of forming zeolite crystals having an ANA framework-type, comprising:
    forming a zeolite growth solution comprising:
        a Si/OH ratio of less than about 1; and
        a Si/Al ratio of between about 6 to 1 and about 15 to 1; and
    heating the zeolite growth solution to a temperature from about 180 degrees Celsius to about 220 degrees Celsius to form the zeolite crystals having an ANA framework-type.

2. A method of forming zeolite crystals having an ANA framework-type, comprising:
    forming a zeolite growth solution containing water, an alumina source, a silica source, and a mineralizing agent; and
    heating the zeolite growth solution to form the zeolite crystals having the ANA framework-type, wherein the zeolite growth solution is characterized by the following molar ratios:
        a Si/OH ratio of less than about 1; and
        a Si/Al ratio of between about 6 to 1 and about 15 to 1.

3. The method of claim 2, wherein the alumina source is sodium aluminate, the silica source is colloidal silica, and the mineralizing agent is sodium hydroxide.

4. The method of claim 2, wherein the heating is carried out at a temperature of at least about 180 degrees Celsius.

5. The method of claim 4, wherein the temperature is from about 180 degrees Celsius to about 220 degrees Celsius.

6. The method of claim 2, wherein the silica source is tetraethylorthosilicate (TEOS).

7. The method of claim 2, wherein the heating is carried out for a period of 21 or more days.

8. The method of claim 2, wherein the zeolite growth solution has a molar composition of $11NaOH:190H_2O$.

9. The method of claim 2, wherein the zeolite growth solution is an organic-free solution.

10. A method of forming zeolite crystals having an ANA framework-type, comprising:
    forming a zeolite growth solution containing water, an alumina source, a silica source, and a mineralizing agent; and
    heating the zeolite growth solution to form the zeolite crystals having the ANA framework-type, wherein the zeolite growth solution is characterized by the following molar ratios:
        a Si/OH ratio of less than about 1; and
        a Si/Al ratio of at least about 6 to 1, wherein the heating is carried out for a period of 21 or more days.

* * * * *

UNITED STATES PATENT AND TRADEMARK OFFICE
CERTIFICATE OF CORRECTION

PATENT NO. : 9,714,174 B2  
APPLICATION NO. : 13/946919  
DATED : July 25, 2017  
INVENTOR(S) : Jeffrey D. Rimer et al.

Page 1 of 2

It is certified that error appears in the above-identified patent and that said Letters Patent is hereby corrected as shown below:

On the page 2, in Column 1, under "Other Publications", Line 3, delete "Paulsbora," and insert -- Paulsboro, --, therefor.

On the page 2, in Column 1, under "Other Publications", Line 4, delete "100?C" and insert -- 100°C --, therefor.

On the page 2, in Column 1, under "Other Publications", Line 24, delete "Tetahedral" and insert -- Tetrahedral --, therefor.

On the page 2, in Column 1, under "Other Publications", Line 44, delete "Cystallization," and insert -- Crystallization, --, therefor.

On the page 2, in Column 2, under "Other Publications", Line 33, delete "Peformance" and insert -- Performance --, therefor.

On the page 2, in Column 2, under "Other Publications", Line 67, delete "claym" and insert -- clay --, therefor.

In Column 10, Line 28, delete "BI-2005M" and insert -- BI-200SM --, therefor.

In Column 18, Line 58, delete "H$_2$that" and insert -- H$_2$O that --, therefor.

In Column 19, Line 20, delete "SiO2:" and insert -- SiO$_2$: --, therefor.

In Column 19, Line 21, delete "H2O" and insert -- H$_2$O --, therefor.

In Column 22, Line 16, delete "141/amd" and insert -- I41/amd --, therefor.

In Column 22, Line 28, delete "(α=6=90°," and insert -- (α=β=90°, --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,714,174 B2

In Column 24, Lines 65-66, delete "by pyramidal" and insert -- bipyramidal --, therefor.

In Column 26, Line 8, in Claim 1, delete "Si/Al" and insert -- Si/Al --, therefor.